United States Patent
Nakano et al.

(10) Patent No.: US 7,125,822 B2
(45) Date of Patent: Oct. 24, 2006

(54) FUEL CELL CATALYST AND FUEL CELL

(75) Inventors: Yoshihiko Nakano, Yokohama (JP); Wu Mei, Yokohama (JP); Maki Yonetsu, Kawasaki (JP); Shinichi Onodera, Yokohama (JP); Seiichi Suenaga, Yokohama (JP); Hideyuki Ohzu, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 81 days.

(21) Appl. No.: 10/638,351

(22) Filed: Aug. 12, 2003

(65) Prior Publication Data

US 2004/0072061 A1  Apr. 15, 2004

(30) Foreign Application Priority Data

Aug. 12, 2002 (JP) .............................. 2002/235072

(51) Int. Cl.
*B01J 23/42* (2006.01)
*B01J 21/18* (2006.01)
*H01M 4/90* (2006.01)
*H01M 4/92* (2006.01)

(52) U.S. Cl. ..................... 502/339; 502/180; 502/185; 502/439; 429/44

(58) Field of Classification Search ............. 429/231.8, 429/44; 502/180, 185, 202, 207, 208, 213, 502/305, 313, 321, 324, 325, 326, 334, 339, 502/349, 350, 353, 355, 439; 420/466
See application file for complete search history.

(56) References Cited

U.S. PATENT DOCUMENTS

| | | | | |
|---|---|---|---|---|
| 3,619,296 A | * | 11/1971 | Niedrach et al. | 429/42 |
| 4,131,721 A | * | 12/1978 | Fung et al. | 429/13 |
| 4,263,376 A | * | 4/1981 | Blurton | 429/42 |
| 5,068,161 A | * | 11/1991 | Keck et al. | 429/44 |
| 5,939,220 A | * | 8/1999 | Gunner et al. | 429/40 |

FOREIGN PATENT DOCUMENTS

| | | | |
|---|---|---|---|
| JP | 08017440 A | * | 1/1996 |
| JP | 8-78021 | | 3/1996 |
| JP | 9-167620 | | 6/1997 |
| JP | 10223233 A | * | 8/1998 |
| JP | 2000-273351 | | 10/2000 |
| WO | WO99/42213 | * | 8/1999 |
| WO | WO 01/92151 | | 12/2001 |
| WO | WO 02/054514 | | 7/2002 |

OTHER PUBLICATIONS

N. M. Rodriguez, et al., Journal of Materials Research, vol. 8, No. 12, pp. 3233-3250, "A Review of Catalytically Grown Carbon Nanofibers", Dec. 1993.

(Continued)

*Primary Examiner*—Patrick Joseph Ryan
*Assistant Examiner*—Melissa Austin
(74) *Attorney, Agent, or Firm*—Oblon, Spivak, McClelland, Maier & Neustadt, P.C.

(57) ABSTRACT

This invention provides a fuel cell catalyst including a carbon support containing at least one first element selected from the group consisting of B, N, and P, and catalyst particles supported on the carbon support, wherein the catalyst particles include at least one of platinum particles and alloy particles containing Pt and an element A, and the element A contains at least one element selected from the group consisting of platinum group elements and period 4 to 6 transition metal elements.

19 Claims, 3 Drawing Sheets

OTHER PUBLICATIONS

C. M. Lukehart, et al., Prepr. Symp. Am. Chem. Soc., Div. Fuel. Chem., vol. 44, No. 4, pp. 982-986, "Preparation of PT-RU or PT-MO Supported Catalysts for PEM or Direct Methanol Fuel Cells From Single-Source Molecular Precursors", 1999.

* cited by examiner

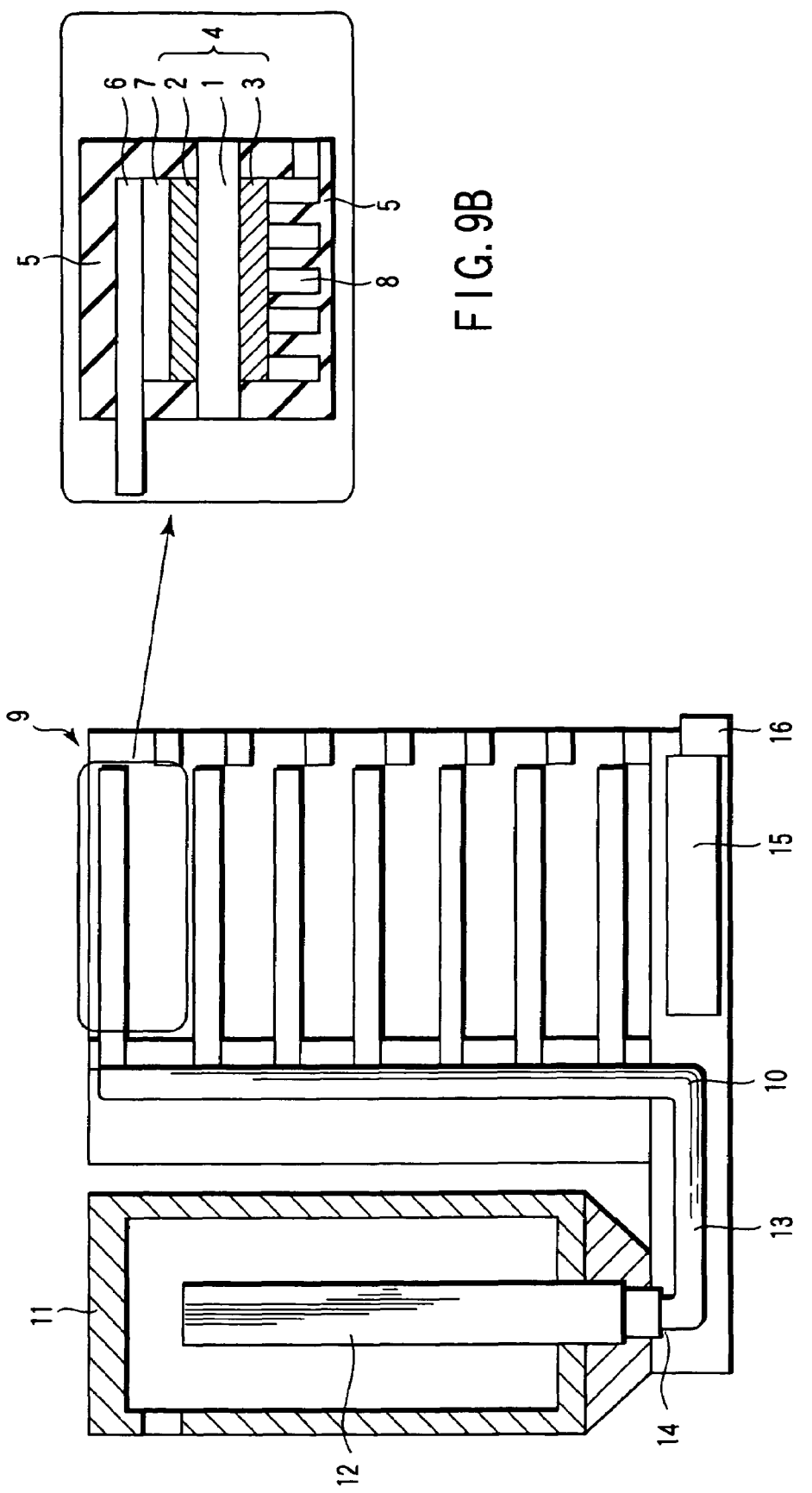

FUEL CELL CATALYST AND FUEL CELL

CROSS-REFERENCE TO RELATED APPLICATIONS

This application is based upon and claims the benefit of priority from the prior Japanese Patent Application No. 2002-235072, filed Aug. 12, 2002, the entire contents of which are incorporated herein by reference.

BACKGROUND OF THE INVENTION

1. Field of the Invention

The present invention relates to a fuel cell catalyst, a membrane-electrode assembly including the fuel cell catalyst, and a fuel cell in which at least one of a cathode electrode and an anode electrode includes the fuel cell catalyst.

2. Description of the Related Art

A fuel cell electrochemically oxidizes fuel such as hydrogen or methanol in the cell, thereby directly converting the chemical energy of the fuel into electrical energy and extracting this electrical energy. Since neither $NO_X$ nor $SO_X$ is produced by combustion of fuel, unlike in a thermal power station, a fuel cell has attracted attention as a clean electrical energy supply source. In particular, a polymer electrolyte fuel cell can be made smaller and lighter than other fuel cells and hence has been developed as a spacecraft power feed. Recently, polymer electrolyte fuel cells are also extensively studied as power supplies for automobiles.

As the electrode structure of a fuel cell, a five-layered structure made up of cathode collector/cathode/proton conductive film/anode/anode collector is known. What is particularly important in the formation of the anode electrode and cathode electrode is to prevent toxication of the electrodes by carbon monoxide or the like and raise the activity per unit catalyst. To avoid toxication and raise the activity, it is conventionally attempted to select a catalyst metal to be supported, and carry this catalyst metal in the form of a metal or an alloy, to produce high-performance fuel cell catalysts and electrodes. The particle size of an alloy or the like is also studied, and a particle size of a few nm is regarded as appropriate.

In a fuel cell catalyst, carbon is generally used as support for supporting a catalyst support. This is because carbon is conductive, electrons generated on the carbon support surface can be extracted, and it is presumably effective to directly adhere the catalyst metal to the carbon support.

Unfortunately, a carbon supported catalyst obtained by supporting platinum or a platinum alloy on a carbon support is inferior in cell performance, such as the voltage characteristic.

BRIEF SUMMARY OF THE INVENTION

It is an object of the present invention to provide a fuel cell catalyst capable of improving the voltage characteristic of a fuel cell, a membrane-electrode assembly including the fuel cell catalyst, and a fuel cell including the fuel cell catalyst.

According to a first aspect of the present invention, there is provided a fuel cell catalyst comprising a carbon support containing at least one first element selected from the group consisting of B, N, and P, and catalyst particles supported on the carbon support, wherein the catalyst particles include at least one of platinum particles and alloy particles containing Pt and an element A, and the element A contains at least one element selected from the group consisting of platinum group elements and period 4 to 6 transition metal elements.

According to a second aspect of the present invention, there is provided a fuel cell catalyst comprising a support containing at least one of an oxide represented by formula (3) below and a composite oxide represented by formula (4) below, catalyst particles provided on the support, and a carbon material provided on the catalyst particles and including at least one of a carbon fiber and carbon tube:

$$M_xO_y \tag{3}$$

$$M_xO_y\text{-}M'_aO_b \tag{4}$$

wherein elements M and M' can be the same or different, and each of the elements M and M' is at least one element selected from the group consisting of Si, Ti, Al, Zr, Ge, Re, V, Mn, W, Mo, and Sn.

According to a third aspect of the present invention, there is provided a fuel cell catalyst comprising a support containing at least one of an oxide represented by formula (3) below and a composite oxide represented by formula (4) below, a carbon material provided on the support and including at least one of a carbon fiber and carbon tube, and catalyst particles provided on the carbon material:

$$M_xO_y \tag{3}$$

$$M_xO_y\text{-}M'_aO_b \tag{4}$$

wherein elements M and M' can be the same or different, and each of the elements M and M' is at least one element selected from the group consisting of Si, Ti, Al, Zr, Ge, Re, V, Mn, W, Mo, and Sn.

According to a fourth aspect of the present invention, there is provided a fuel cell comprising an anode electrode including an anode catalyst, a cathode electrode including a cathode catalyst, and a proton conductive solid film provided between the anode electrode and cathode electrode, wherein at least one of the anode catalyst and cathode catalyst comprises a carbon support containing at least one first element selected from the group consisting of B, N, and P, and catalyst particles supported on the carbon support, and the catalyst particles include at least one of platinum particles and alloy particles containing Pt and an element A, and the element A is at least one element selected from the group consisting of platinum group elements and period 4 to 6 transition metal elements.

According to a fifth aspect of the present invention, there is provided a fuel cell comprising an anode electrode including an anode catalyst, a cathode electrode including a cathode catalyst, and a proton conductive solid film provided between the anode electrode and cathode electrode, wherein at least one of the anode catalyst and cathode catalyst comprises a catalyst support containing at least one of an oxide represented by formula (3) above and a composite oxide represented by formula (4) above, catalyst particles provided on the support, and a carbon material provided on the catalyst particles and including at least one of a carbon fiber and carbon tube.

According to a sixth aspect of the present invention, there is provided a fuel cell comprising an anode electrode including an anode catalyst, a cathode electrode including a cathode catalyst, and a proton conductive solid film provided between the anode electrode and cathode electrode, wherein at least one of the anode catalyst and cathode catalyst comprises a catalyst support containing at least one of an oxide represented by formula (3) above and a composite oxide represented by formula (4) above, a carbon material provided on the support and including at least one of a carbon fiber and carbon tube, and catalyst particles provided on the carbon material.

According to a seventh aspect of the present invention, there is provided a membrane-electrode assembly comprising an anode electrode including an anode catalyst, a cathode electrode including a cathode catalyst, and a proton conductive solid film provided between the anode electrode and cathode electrode, wherein at least one of the anode catalyst and cathode catalyst comprises a carbon support containing at least one first element selected from the group consisting of B, N, and P, and catalyst particles supported on the carbon support, and the catalyst particles include at least one of platinum particles and alloy particles containing Pt and an element A, and the element A is at least one element selected from the group consisting of platinum group elements and period 4 to 6 transition metal elements.

According to an eighth aspect of the present invention, there is provided a membrane-electrode assembly comprising an anode electrode including an anode catalyst, a cathode electrode including a cathode catalyst, and a proton conductive solid film provided between the anode electrode and cathode electrode, wherein at least one of the anode catalyst and cathode catalyst comprises a catalyst support containing at least one of an oxide represented by formula (3) above and a composite oxide represented by formula (4) above, catalyst particles provided on the support, and a carbon material provided on the catalyst particles and including at least one of a carbon fiber and carbon tube.

According to a ninth aspect of the present invention, there is provided a membrane-electrode assembly comprising an anode electrode including an anode catalyst, a cathode electrode including a cathode catalyst, and a proton conductive solid film provided between the anode electrode and cathode electrode, wherein at least one of the anode catalyst and cathode catalyst comprises a catalyst support containing at least one of an oxide represented by formula (3) above and a composite oxide represented by formula (4) above, a carbon material provided on the support and including at least one of a carbon fiber and carbon tube, and catalyst particles provided on the carbon material.

BRIEF DESCRIPTION OF THE SEVERAL VIEWS OF THE DRAWING

FIG. 9A is a schematic sectional view showing an embodiment of a fuel cell according to the present invention;

FIG. 9B is an enlarged schematic of an electromotive unit of the fuel cell shown in FIG. 9A.

DETAILED DESCRIPTION OF THE INVENTION

Figure 1:
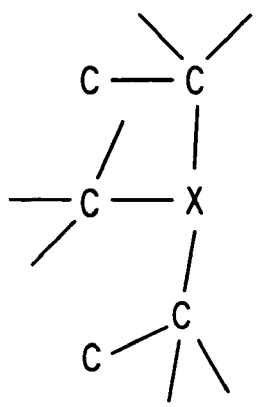
FIG. 1 is a schematic showing an example of the state in which an element X bonds to a carbon support of a first fuel cell catalyst according to the present invention.

The first and second fuel cell catalysts according to the present invention will be described below.

The first fuel cell catalyst according to the present invention comprises a carbon support containing at least one first element (to be referred to as an element X hereinafter) selected from the group consisting of B, N, and P, and catalyst particles supported on the carbon support, wherein the catalyst particles include at least one of platinum particles and alloy particles containing Pt and an element A, and the element A contains at least one element selected from the group consisting of platinum group elements and period 4 to 6 transition metal elements.

This catalyst can enhance the interaction between the carbon support and the catalyst particles as explained in detail in (a) below, and can also enhance the interaction between the catalyst and a proton conductive substance as explained in (b) and (c) below. Therefore, this catalyst can increase the utilization of the catalyst particles and improve the performance (particularly the voltage characteristic) of the fuel cell.

(a) An interaction can be caused between the electron orbit of the element X in the carbon support and the electron orbit of metal (particularly Pt) in the catalyst particle. Accordingly, the interaction between the carbon support and the catalyst particles can be enhanced.

(b) By introducing the element X into the carbon support, the surface state of the carbon support changes to improve the wettability. This improves the dispersibility of the catalyst into the proton conductive substance.

(c) The element X introduced into the carbon support can cause an interaction with a proton conducting portion of the proton conductive substance. This will be explained in detail below by taking NAFION (registered trademark) as an example of the proton conductive substance. Since a boron atom in the carbon support has an empty orbit, this boron atom can cause a strong interaction by forming, e.g., a B—O coordinate bond with an oxygen atom of a sulfonic acid group ($SO_3H$) in NAFION. On the other hand, each of a nitrogen atom and phosphor atom has a lone electron pair and hence functions as a base. Accordingly, each of this nitrogen atom and this phosphor atom can cause a large interaction by forming a salt with the sulfonic acid group in NAFION.

In accordance with (a) to (c) described above, the proton conductive substance is evenly dispersed in the catalyst particles of the carbon support. This makes it possible to increase effective three-phase interfaces and increase the utilization of the catalyst.

As the carbon support containing the element X, particulate and fiber-form carbon supports can be used. The average particle size of the particulate carbon support is desirably 1 μm or less. Also, a specific surface area measured by BET is preferably 30 to 2,500 m²/g. If this specific surface area is less than 30 m²/g, the supported amount of the catalyst particles may become insufficient. If the specific surface area exceeds 2,500 m²/g, synthesis becomes difficult. The specific surface area measured by BET is more preferably 50 to 600 m²/g.

The diameter of the fiber-form carbon support is preferably 1 μm or less. Also, a specific surface area measured by BET is preferably 30 to 2,500 m²/g. If this specific surface area is less than 30 m²/g, the supported amount of the catalyst particles may become insufficient. If the specific surface area exceeds 2,500 m²/g, synthesis becomes difficult. The specific surface area measured by BET is more preferably 50 to 600 m²/g.

The content of the element X in the carbon support is desirably 0.1 to 20 wt % for the reasons explained below. If the content of the element X is less than 0.1 wt %, the interaction between the carbon support and the catalyst particles becomes difficult to improve, so excellent cell performance may not be obtained. If the content of the element X exceeds 20 wt %, the electron conductivity of the carbon support largely lowers, and this may make it impossible to obtain excellent cell performance. The content of the element X is more preferably 0.15 to 5 wt %.

Figure 2:
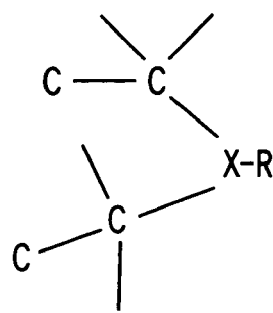
FIG. 2 is a schematic showing another example of the state in which the element X bonds to the carbon support of the first fuel cell catalyst according to the present invention.
Figure 3:
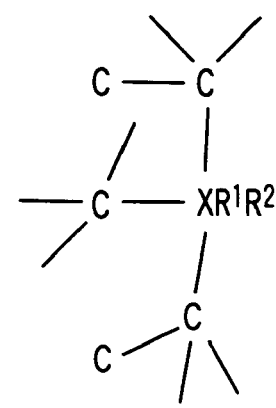
FIG. 3 is a schematic showing still another example of the state in which the element X bonds to the carbon support of the first fuel cell catalyst according to the present invention.

FIGS. 1 to 3 show examples of the state in which the element X bonds to the carbon support. FIGS. 1 and 2 illustrate examples in which a carbon atom forming the carbon skeleton of the carbon support is substituted with the element X. Referring to FIG. 2, R is H or a hydrocarbon group. FIG. 3 shows an example in which the element X is bonded to a carbon atom forming the carbon skeleton of the carbon support. Referring to FIG. 3, each of $R^1$ and $R^2$ is H or a hydrocarbon group. $R^1$ and $R^2$ can be the same or different.

The catalyst particles include at least one of platinum particles and alloy particles containing Pt and an element A. The element A is at least one element selected from the group consisting of platinum group elements, period 4 to 6 transition metal elements, and tin. Examples of the platinum group elements are Pt, Ru, Rh, Ir, Os, and Pd. Examples of the period 4 to 6 transition metal elements are Sc, Ti, V, Cr, Mn, Fe, Co, Ni, Cu, Zn, Y, Zr, Nb, Mo, Tc, Ru, Rh, Pd, Ag, Cd, Hf, Ta, W, Re, Os, Ir, Pt, Au, and Hg. Of these elements, Ru, Ir, Os, Fe, Co, Ni, W, V, Mo, Sn, and Re are preferred. In particular, Ru, Ir, Os, W, V, Mo, Sn, and Re have low solubility in a proton conductive substance such as a Nafion (the registered trademark of Du Pont, U.S.A.) solution, and especially W, V, Mo, Sn can reduce the catalyst manufacturing cost.

Practical examples of the catalyst particles are Pt, Pt—Ru, Pt—Ru—Ir, Pt—Ru—Ir—Os, Pt—Ir, Pt—Mo, Pt—Fe, Pt—Co, Pt—Ni, Pt—W, Pt—Sn, Pt—Ce, and Pt—Re. However, the present invention is not limited to these examples.

An alloy particle containing Pt and the element A can achieve high catalyst activity with a small Pt amount when the number of Pt atoms is made larger than that of element A atoms on the surface. This alloy particle desirably satisfies $$Y_1 > Y_2 \quad (1)$$

where $Y_1$ is the number of Pt atoms when the number of element A atoms is 1 on the surface of the alloy particle, and $Y_2$ is the number of Pt atoms when the number of element A atoms is 1 in the interior of the alloy particle, or $$Y_1 > Y_3 \quad (2)$$

where $Y_1$ is the number of Pt atoms when the number of element A atoms is 1 on the surface of the alloy particle, and $Y_3$ is the total number of Pt atoms when the total number of element A atoms is 1 in the alloy particle.

The alloy particle meeting expression (1) or (2) described above has a pseudo core-shell structure in which the concentration of the element A is high near the center and the concentration of Pt is high in the surface layer portion. Therefore, catalyst activity equal to or higher than that when a Pt metal alone is used as a catalyst particle can be realized with a small Pt amount. Accordingly, a high voltage can be obtained from a fuel cell containing the alloy particles meeting expression (1) or (2) above. Especially when the element A is at least one element selected from the group consisting of W, V, Mo, and Sn, the manufacturing cost can be reduced, and the catalyst activity can be further increased.

Figure 4:
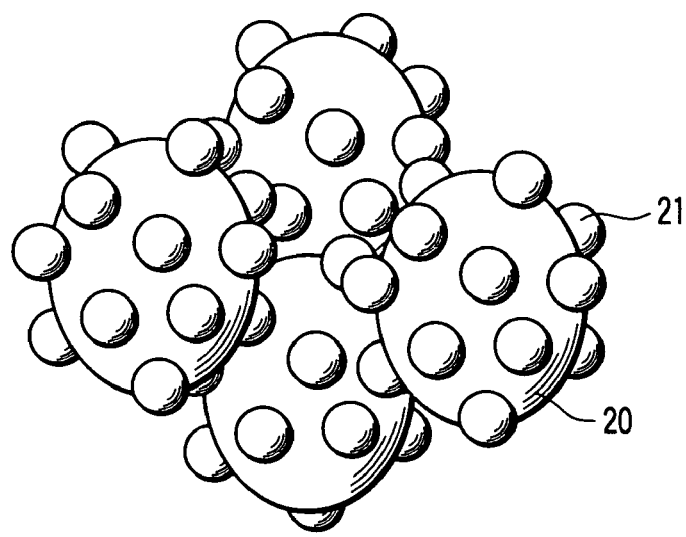
FIG. 4 is a schematic showing an example of the first fuel cell catalyst according to the present invention.
Figure 5:
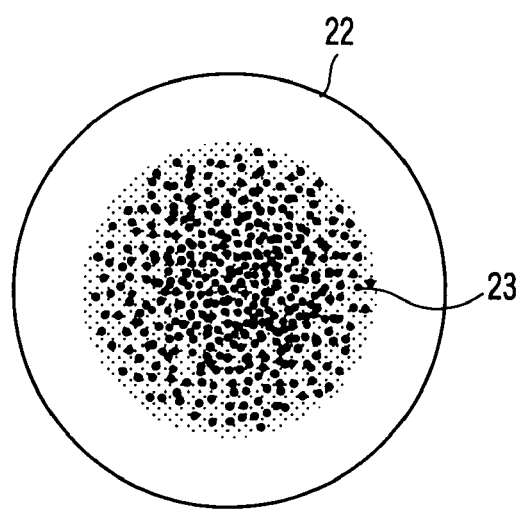
FIG. 5 is an enlarged schematic of a catalyst particle of the fuel cell catalyst shown in FIG. 4.

FIGS. 4 and 5 show an example of a catalyst containing the alloy particles meeting expression (1) or (2). This catalyst contains a particulate carbon support 20 containing the element X, and Pt alloy particles 21 supported on the particulate carbon support 20 and containing the element A. In the alloy particle 21, the ratio ($Y_1$) of the number of Pt atoms to the number of element A atoms on a surface 22 is higher than the ratio ($Y_2$) of the number of Pt atoms to the number of element A atoms in an interior 23, or the number-of-atoms ratio $Y_1$ is higher than the ratio ($Y_3$) of the total number of Pt atoms to the total number of element A atoms.

The average particle size of the catalyst particles is desirably 1 to 100 nm for the reasons explained below. If the average particle size is less than 1 nm, the carbon-supported catalyst shows a behavior of an organic metal complex, so high catalyst activity may not be obtained. If the average particle size exceeds 100 nm, the number of Pt atoms per catalyst particle increases to, e.g., several hundreds of thousands. Since this weakens the interaction between the element X of the carbon support and the catalyst particle, high catalyst activity may not be obtained. The average particle size is more preferably 2 to 5 nm.

Methods of forming the supported catalyst will be described next.

A first method of manufacturing the fuel cell catalyst according to the present invention comprises heating a carbon support at 600 to 900° C. in an atmosphere containing a gas of a compound which contains at least one element selected from the group consisting of B, N, and P, or performing plasma processing for a carbon support in an atmosphere containing a gas of a compound which contains at least one element selected from the group consisting of B, N, and P, thereby obtaining a carbon support containing at least one element selected from the group consisting of B, N, and P, and causing the carbon support to support catalyst particles including at least one of platinum particles and alloy particles containing Pt and the element A. The element A is at least one element selected from the group consisting of platinum group elements and period 4 to 6 transition metal elements.

A second method of manufacturing the fuel cell catalyst according to the present invention comprises causing a carbon support to carry catalyst particles including at least one of platinum particles and alloy particles containing Pt and the element A, the element A being at least one element selected from the group consisting of platinum group elements and period 4 to 6 transition metal elements, heating the carbon support supporting the catalyst particles at 600 to 900° C. in an atmosphere containing a gas of a compound which contains at least one element selected from the group consisting of B, N, and P, or performing plasma processing for the carbon support supporting the catalyst particles in an atmosphere containing a gas of a compound which contains at least one element selected from the group consisting of B, N, and P.

First, the first method of manufacturing the fuel cell catalyst according to the present invention will be explained in detail below.

A carbon support is placed in an oven, and a gas of a compound containing the element X is supplied into the oven. After the materials are heated to 600 to 900° C. to cause a reaction for a predetermined time, the temperature is returned to room temperature to obtain a carbon support containing the element X. In this step, the concentration of the element X-containing compound in the oven can be adjusted by mixing hydrogen gas or an inert gas with the element X-containing compound. Also, the concentration of the element X introduced into the carbon support can be controlled by the concentration of the element X-containing compound in the oven, the reaction temperature, and the reaction time.

In the method using a plasma, on the other hand, carbon is placed in a vacuum chamber, and a plasma is generated by performing discharge at an appropriate vacuum degree obtained by evacuation. The element X-containing compound is then supplied in the form of a gas by using an inert gas as a support gas and caused to react for a predetermined time, thereby obtaining a carbon support containing the element X. As the plasma generator, a general radio-frequency (RF) plasma generator or microwave plasma generator can be used.

Practical examples of the element X-containing compound are $NH_3$, $NH_2NH_2$, $CH_3NH_2$, $CH_3CH_2NH_2$, $BH_3$, $B_2H_6$, $C_6H_5BH_2$, $PH_3$, $C_6H_5PH_2$, $BH_3NH_3$, $PH_2PH_2$, $B_3N_3H_6$, $(CH_3)_3P$, and $(CH_3)_3B$. However, the present invention is not limited to these examples.

Subsequently, the carbon support containing the element X is suspended in water and heated, and a salt as a precursor of the aforementioned catalyst is added. After that, alkali is added to make the material lightly alkaline, and heating is continued for a while. The resultant material is filtered, and the precipitate is washed. This precipitate is placed in a flask and heated after pure water is added. When a certain time has elapsed, the material is filtered. This process is repeated until ion components completely disappear, and the precipitate is dried by a dryer. Then, the dried precipitate is placed in an atmosphere oven and heated while a gas containing hydrogen is fed. The temperature of the oven is preferably 100° C. to 900° C., and particularly preferably, 200 to 500° C. If the temperature is less than 100° C., crystallization and/or reduction of the catalyst becomes insufficient, so the particle size readily increases when this catalyst is used in an electrode. If the temperature exceeds 900° C., the particle size of the catalyst increases, and this may decrease the catalyst activity.

The second method of manufacturing the fuel cell catalyst according to the present invention will be explained next.

First, a carbon support is suspended in water and heated, and a salt as a precursor of the aforementioned catalyst is added. After that, alkali is added to make the material lightly alkaline, and heating is continued for a while. The resultant material is filtered, and the precipitate is washed. This precipitate is placed in a flask and heated after pure water is added. When a certain time has elapsed, the material is filtered. This process is repeated until ion components completely disappear, and the precipitate is dried by a dryer.

Then, the dried precipitate is placed in an atmosphere oven and heated while a gas containing hydrogen is fed. The temperature of the oven is preferably 100° C. to 900° C., and particularly preferably, 200 to 500° C. If the temperature is less than 100° C., crystallization and/or reduction of the catalyst becomes insufficient, so the particle size readily increases when this catalyst is used in an electrode. If the temperature exceeds 900° C., the particle size of the catalyst increases, and this may decrease the catalyst activity. The thus obtained carbon-supported catalyst is subjected to the process similar to that of the method of synthesizing the element X-containing carbon support described above. Consequently, a catalyst using the carbon support containing element X is obtained.

A method of causing the carbon support to support the alloy particles satisfying expression (1) or (2) will be described below.

First, the carbon support is dispersed in water, a salt of the element A is added, and chloroplatinic acid is also added. Sodium hydrogen carbonate is then added to neutralize the chloroplatinic acid, thereby obtaining a coprecipitate of a hydroxide of the element A and platinum hydroxide formed on the carbon support. This material is filtered, washed with dilute sulfuric acid, further washed with ion exchange water, and dried. The obtained catalyst precursor is reduced in a hydrogen atmosphere at 700 to 1,000° C. to obtain a carbon support supporting alloy particles. The element X can be introduced into the carbon support either before or after the alloy particles are supported.

A carbon support supporting the alloy particles satisfying expression (1) or (2) is obtained by the above method presumably because one of phenomena explained in (1) to (3) below participates.

(1) In the coprecipitate formation stage, most of the hydroxide of the element A forms a core, and most of the platinum hydroxide forms a shell. The material is reduced in this state.

(2) Pt which is readily reduced is reduced first, hydrogen is adsorbed by platinum obtained by the reduction, and the hydroxide of the element A is gradually reduced.

(3) In the hydrogen atmosphere, the material is energetically stable when Pt exists on the surface.

Note that the alloy particles meeting expression (1) or (2) can also be prepared by the following method. That is, nano-particles of a metal A forming a core are formed and dispersed in a solution. Then, hydrogen is fed and well adsorbed to the surfaces of these nano-particles of the metal A. A salt containing Pt is dissolved in a solution and added to the material. Since this causes a reduction reaction on the nano-particle surfaces of the metal A, a shell is formed by platinum, and alloy particles are obtained.

The second fuel cell catalyst according to the present invention will be described below.

A catalyst A of the second fuel cell catalyst according to the present invention comprises a support containing at least one of an oxide represented by formula (3) below and a composite oxide represented by formula (4) below, catalyst particles supported on the support, and a carbon material provided on the catalyst particle and including at least one of a carbon fiber and carbon tube:

$$M_xO_y \qquad (3)$$

$$M_xO_y\text{-}M'_aO_b \qquad (4)$$

wherein elements M and M' can be the same or different, and each of the elements M and M' is at least one element selected from the group consisting of Si, Ti, Al, Zr, Ge, Re, V, Mn, W, Mo, and Sn. x and a are the molar ratios of the elements M and M', respectively, and y and b are the molar ratios of O.

A catalyst B of the second fuel cell catalyst according to the present invention comprises a support containing at least one of an oxide represented by formula (3) above and a composite oxide represented by formula (4) above, a carbon material provided on the support and including at least one of a carbon fiber and carbon tube, and catalyst particles provided on the carbon material.

The conventionally used carbon catalyst is obtained by supporting platinum particles or platinum alloy particles on a carbon support. Therefore, if this carbon supported catalyst is brought into contact with an organic solvent (particularly alcohol) in the presence of oxygen, the possibility of it starting a fire is very high. A solution containing alcohol is used in a proton conductive substance in order to improve its solubility. Accordingly, when a slurry for forming an electrode is prepared by using the conventional carbon supported catalyst, there is the possibility of it causing a fire. To prevent this, therefore, it is necessary to add water to the carbon catalyst, stir the resultant material well to wet the catalyst with water, and then add a solution containing a proton conductive substance to form a slurry. However, since the carbon support is hydrophobic, the carbon catalyst particles flocculate when the carbon catalyst is stirred after water is added to it. Accordingly, a proton conductive substance added after that is not supplied throughout the entire catalyst, so the slurry dispersibility deteriorates. This increases a portion where a three-phase interface necessary for a fuel cell reaction cannot be formed, and lowers the utilization of the catalyst. Therefore, the present inventors added hydrophilic particles such as $TiO_2$ particles to the carbon catalyst. However, the carbon supported catalyst particles and the hydrophilic particles merely individually flocculated, so the problem was not solved. In addition, when a unsupported catalyst is used, no flocculation occurs during the preparation of the slurry. However, a conduction path is formed by contact between the unsupported catalyst particles. This increases the necessary amount of catalyst and hence increases the cost.

In the present invention, to satisfy both the functions, i.e., the dispersibility and conductivity, the hydrophilic nature of a support is improved by using a material containing an oxide represented by $M_xO_y$ or a composite oxide represented by $M_xO_y$-$M'_aO_b$. As a conduction path, a carbon nanofiber or carbon nanotube is formed on the catalyst, thereby ensuring the electron conductivity of the catalyst.

More specifically, since the hydrophilic nature of the support is high, flocculation of the catalyst when water and the catalyst are mixed can be reduced. Accordingly, a proton conductive substance such as a NAFION (registered trademark) solution can be supplied throughout the entire catalyst surface. Also, the carbon nanofiber or carbon nanotube extends from the support or from the carbon particle supported on the support. Since this allows easy contact of the catalyst particles, a conduction path can be formed with a small catalyst amount. Accordingly, the present invention can realize a high catalyst utilization with a small catalyst amount.

Furthermore, the second fuel cell catalyst according to the present invention has high hydrophilic nature. Therefore, the output characteristic can be improved if the fuel cell is operated in a high temperature and low humidity environment.

Figure 6:
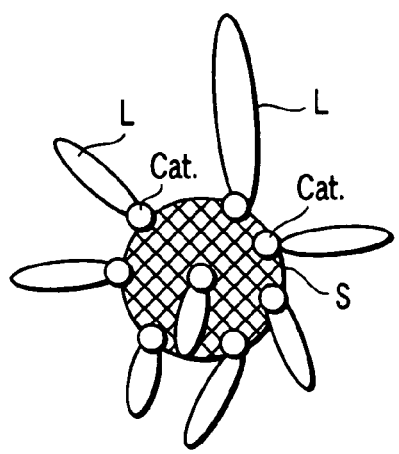
FIG. 6 is a schematic showing an example of the second fuel cell catalyst according to the present invention.
Figure 7:
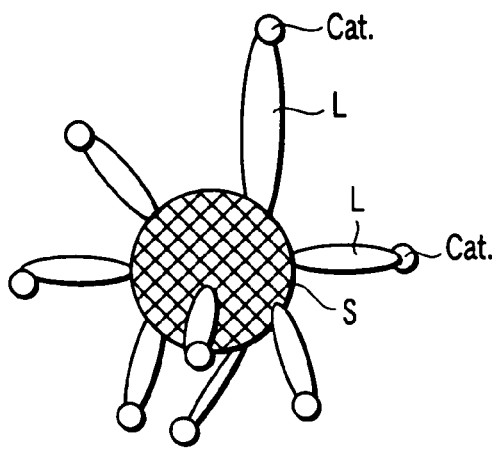
FIG. 7 is a schematic showing another example of the second fuel cell catalyst according to the present invention.
Figure 8:
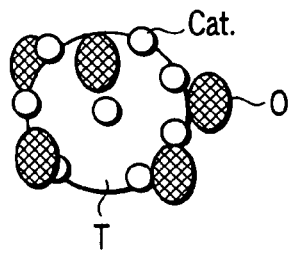
FIG. 8 is a schematic showing a fuel cell catalyst of a reference example.

FIGS. 6 to 8 show schematic structures of the fuel cell catalyst. As shown in FIG. 6, a fuel cell catalyst comprises a support S containing an oxide represented by $M_xO_y$ or a composite oxide represented by $M_xO_y$-$M'_aO_b$, catalyst particles Cat. supported on the supports S, and a carbon nanotube or carbon nanofiber L formed on each catalyst particle Cat. As shown in FIG. 7, a fuel cell catalyst comprises a support S containing an oxide represented by $M_xO_y$ or a composite oxide represented by $M_xO_y$-$M'_aO_b$, carbon nanotubes or carbon nanofibers L formed on the support S, and a catalyst particle Cat. supported on each carbon nanotube or carbon nanofiber L. In a catalyst shown in FIG. 8, both catalyst particles Cat. and an oxide O are supported on a carbon support T. Comparison of the fuel cell catalysts, shown in FIG. 6 and FIG. 7, with the catalyst shown in FIG. 8 is as follows. In the fuel cell catalysts, the conductive carbon or the carbon particles exist on the outermost side. Therefore, an electron conduction path is easily formed, and the cell performance can be improved. In the catalyst shown in FIG. 8, a hydrophilic nature is given only to the vicinity of the oxide, so the hydrophilic nature of the catalyst, as shown in FIG. 6 and FIG. 7.

The average particle size of the support containing at least one of an oxide represented by $M_xO_y$ and a composite oxide represented by $M_xO_y$-$M'_aO_b$ is preferably 1 μm or less. Also, a specific surface area measured by BET is preferably 10 to 2,500 $m^2/g$. If this specific surface area is less than 10 $m^2/g$, the amount of catalyst particles supported may become insufficient. If the specific surface area exceeds 2,500 $m^2/g$, synthesis becomes difficult to perform. The specific surface area measured by BET is more preferably 50 to 600 $m^2/g$.

Practical examples of the oxide support and composite oxide support are $SiO_2$, $Al_2O_3$, $WO_3$, $MoO_3$, $SnO_2$, $TiO_2$, $ZrO_2$, $SnO_2$, $SiO_2$—$Al_2O_3$, $SiO_2$—$B_2O_3$, $SiO_2$—$WO_3$, $SiO_2$—$P_2O_5$, $SiO_2$—$MoO_3$, $SiO_2$—$RuO_2$, $SiO_2$—$Ir_2O_3$, $SiO_2$—$PtO_2$, $SiO_2$—$Rh_2O_3$, $SiO_2$—$PdO$, $SiO_2$—$ZrO_2$, $SiO_2$—$TiO_2$, $SiO_2$—$Hf_2O_3$, $SiO_2$—$SnO_2$, $SiO_2$—$Al_2O_3$—$P_2O_5$, $SiO_2$—$TiO_2$—$P_2O_5$, and $SiO_2$—$WO_3$—$P_2O_5$. However, the present invention is not limited to these examples.

The carbon material contains at least one of carbon fibers and carbon tubes. This carbon material can further contain carbon particles. On the carbon fibers and carbon tubes, carbon nanofibers and carbon nanotubes are preferred. Carbon nanofibers and carbon nanotubes mean carbon fibers and carbon tubes having an average diameter of 1 to 5,000 nm (more preferably, 10 to 500 nm).

In the catalysts A and B, the average particle size of the support containing at least one of an oxide represented by $M_xO_y$ and a composite oxide represented by $M_xO_y$-$M'_aO_b$ is desirably 20 to 500 nm, the average particle size of the catalyst particles is desirably 1/10 that of the support or less, and the length of the carbon nanofiber and carbon nanotube is desirably equal to or larger than the particle size of the catalyst particles. A catalyst having this arrangement can greatly increase both the hydrophilic nature and conductivity. Accordingly, the output characteristic can be improved especially when the fuel cell is operated under high temperature and low humidity.

The catalyst particles preferably contain one or both of platinum particles and alloy particles containing platinum and at least one element (element A) selected from the group consisting of platinum group elements and period 4 to 6 transition metal elements. Examples of the platinum group elements are Pt, Ru, Rh, Ir, Os, and Pd. Examples of the period 4 to 6 transition metal elements are Sc, Ti, V, Cr, Mn, Fe, Co, Ni, Cu, Zn, Y, Zr, Nb, Mo, Tc, Ru, Rh, Pd, Ag, Cd, Hf, Ta, W, Re, Os, Ir, Pt, Au, and Hg. Of these elements, Ru, Ir, Os, Fe, Co, Ni, V, Re, W, and Mo are preferred.

Practical examples of the catalyst particles are Pt, Pt—Ru, Pt—Ru—Ir, Pt—Ru—Ir—Os, Pt—Ir, Pt—Mo, Pt—Fe, Pt—Co, Pt—Ni, Pt—W, Pt—Sn, Pt—Ce, and Pt—Re. However, the present invention is not limited to these examples.

The catalyst particles of the catalyst A of the second fuel cell catalyst according to the present invention desirably contain Pt particles or Pt—Fe particles. The catalyst particles of the catalyst B desirably contain Pt—Co particles, Pt—Ni particles, or Pt—Ru particles.

In the alloy particle containing Pt and the element A, high catalyst activity can be obtained with a small Pt amount by making the number of Pt atoms larger than that of element A atoms on the surface. Also, this alloy particle has a pseudo core-shell structure in which the concentration of the element A is high near the center and the concentration of Pt is high in the surface portion by satisfying expression (1) or (2). Therefore, catalyst activity equal to or higher than that when a Pt metal alone is used as catalyst particles can be realized with a small Pt amount.

A method of forming the supported catalyst will be described below.

A method of manufacturing the third fuel cell catalyst according to the present invention comprises adding a precipitating medium containing an aqueous alkali solution to a mixture containing a support which contains at least one of an oxide represented by $M_xO_y$ (M is at least one element selected from the group consisting of Si, Ti, Al, Zr, Ge, Re, V, Mn, W, Mo, and Sn) and a composite oxide represented by $M_xO_y\text{-}M'_aO_b$ (each of M and M' is at least one element selected from the group consisting of Si, Ti, Al, Zr, Ge, Re, V, Mn, W, Mo, and Sn), an aqueous solution of platinic acid or platinate, and an aqueous solution of at least one salt of period 4 to 6 transition metals, thereby supporting a platinum-transition metal hydroxide or oxide on the surface of the support, filtering and drying the obtained precipitate, reducing the platinum-transition metal hydroxide or oxide on the support to obtain a support supporting a platinum-transition metal alloy, and forming carbon fibers and carbon tubes on the support supporting the platinum-transition metal alloy by thermal CVD using hydrocarbon as a source gas.

The method of manufacturing the third fuel cell catalyst according to the present invention will be explained in detail below.

A support containing at least one of an oxide represented by $M_xO_y$ and a composite oxide represented by $M_xO_y\text{-}M'_aO_b$ is suspended in water, and a salt as a precursor of the aforementioned catalyst is added. After that, an alkali is added to make the material lightly alkaline, and heating is continued for a while. The resultant material is filtered, and the precipitate is washed. This precipitate is placed in a flask and heated after pure water is added. When a certain time has elapsed, the material is filtered. This process is repeated until ion components completely disappear, and the precipitate is dried by a dryer. Then, the dried precipitate is placed in an atmosphere oven and heated while a gas containing hydrogen is fed. The temperature of the oven is preferably 100° C. to 900° C., and particularly preferably, 200 to 700° C. If the temperature is less than 100° C., crystallization and or reduction of the catalyst becomes insufficient, so the particle size readily increases when this catalyst is used in an electrode. If the temperature exceeds 900° C., the particle size of the catalyst increases, and this may decrease the catalyst activity.

Subsequently, carbon fibers or carbon tubes are formed on the oxide or composite oxide support supporting the catalyst particles by thermal oxidation using hydrocarbon as a source gas, thereby obtaining the second fuel cell catalyst according to the present invention. The structure of the catalyst can be changed by the type of catalyst particles. For example, the catalyst A is obtained when Pt particles or Pt—Fe particles are used. Also, the catalyst B is obtained when Pt—Co particles, Pt—Ni particles, or Pt—Ru particles are used as catalyst particles. When the carbon fibers or carbon tubes are formed by thermal CVD, hydrogen gas or an inert gas may also be mixed with the source gas. The temperature can be 300° C. to 900° C., and is preferably 400° C. to 800° C. If the temperature is lower than 300° C., the growth of carbon is very slow. If the temperature exceeds 900° C., the size of the catalyst particles on the support increases, and this may deteriorate the catalyst performance.

The supported amount is desirably 30 to 80 wt % with respect to 100 wt % of the fuel cell catalyst. If the supported amount is less than 30 wt %, the cell performance may deteriorate. If the supported amount exceeds 80 wt %, the catalyst particles may not be supported well on the support.

An electrode composition including the first and second fuel cell catalysts according to the present invention will be described below. This electrode composition includes a proton conductive substance and the first and second fuel cell catalysts according to the present invention. It is also possible to add a conductive substance such as graphite or a polymer such as PTFE if the addition is effective in the formation of an electrode.

The proton conductive substance can be any substance which can conduct protons. Practical examples are fluorine-based resins (e.g., NAFION, FLEMION, and ACIPREX) having a sulfonic acid group, and inorganic materials such as tungstic acid and phosphotungstic acid. However, the proton conductive substance is not limited to these materials. The mixing amount of the proton conductive substance is preferably 1 to 1,000 parts by weight with respect to 100 parts by weight of the support supported catalyst. If the mixing amount is less than 1 part by weight, the cell characteristics may deteriorate because the proton conductive substance is insufficient. If the mixing amount exceeds 1,000 parts by weight, the cell characteristics may deteriorate because the resistance rises. The mixing amount of the proton conductive substance is more preferably 10 to 200 parts by weight.

A wet method and dry method can be used to form an electrode using this electrode composition. These methods will be described below.

The wet method will be described first. In the wet method, a slurry containing the above composition must be formed. That is, water is added to the above-mentioned catalyst, and the resultant material is well stirred. A proton conductive solution is added, and an organic solvent is also added. After the resultant material is stirred well, a conductive substance is added and dispersed to form a slurry. The organic solvent used is a single solvent or a mixture of two or more solvents. In the dispersion step, a slurry composition as a dispersion can be formed by using a generally used dispersing machine (e.g., a ball mill, sand mill, bead mill, paint shaker, or nanomizer). A water-repellent collector (carbon paper or carbon cloth) is coated with the formed dispersion (slurry composition) by using various methods, and the resultant structure is dried to obtain an electrode having the above electrode composition. The solvent amount in the slurry composition is so adjusted that the solid component is 5 to 60%. If the solid component is less than 5%, the film readily peels. If the solid component exceeds 60%, coating becomes difficult to perform. The carbon paper or carbon cloth is given water repellency to such an extent that this carbon paper or carbon cloth can be coated with the slurry composition.

An electrode formation method using the dry method will be described next.

First, a composition containing the catalyst, the conductive substance, a binder resin, and a pore forming agent will be explained.

The catalyst and conductive substance described above are used. The pore forming agent can be any substance which dissolves in an acid, alkali, or water. Practical examples are lithium carbonate, ammonium carbonate, lithium fluoride, polyvinyl alcohol, polyethylene oxide, phosphotungstic acid and its salts, phosphomolybdic acid and its salts, and ammonium chloride. However, the pore forming agent is not limited to these examples.

The composition ratio of the pore forming agent in the composition is preferably 1 to 50 wt %. If the composition ratio is less than 1 wt %, no pore forming effect appears, so the catalyst cannot be impregnated with the proton conductive substance any longer. If the composition ratio exceeds 50 wt %, the electrode becomes fragile in the pore formation process of the electrode formation, and this makes the electrode difficult to form. The composition ratio is particularly preferably 5 to 30 wt %.

The binder resin can be any thermoplastic resin such as polyolefin, polyester, fluorine resin, polyketone, polyether, or polysulfone. The amount of binder resin is preferably 10 to 200 parts by weight with respect to 100 parts by weight as the total amount of the support supported catalyst and conductive substance. If this amount is less than 10 parts by weight, it becomes difficult to form the composition into a sheet. If the amount exceeds 200 parts by weight, the binder resin turns into a resistance and deteriorates the cell characteristics.

The binder resin and pore forming agent are added to the catalyst described above. The resultant material is kneaded by a roll or the like and uniformly dispersed to obtain a uniformly dispersed composition. Heat can also be added during the kneading.

The composition is adhered to a mesh-like or porous collector, thereby obtaining a sheet-form electrode. Alternatively, the composition is formed into a sheet by a roll or the like and then adhered to a collector.

The catalyst composition containing the pore forming agent is dipped in an aqueous acidic or alkaline solution to dissolve the pore forming agent. The resultant material is washed well with ion exchange water, and dipped in a solution in which the proton conductive substance is dissolved, thereby impregnating the catalyst layer with the proton conductive substance. An electrode is obtained by vaporizing the solvent.

A cathode electrode and anode electrode are formed by one of the above two methods, and an electrolyte layer such as a proton conductive solid film is placed between the cathode electrode and anode electrode. The resultant structure is bonded by thermocompression bonding by using a hot roll or hot press, thereby obtaining a membrane-electrode assembly. When the first and second fuel cell catalysts according to the present invention are used, Pt—Ru which is highly resistant to methanol and carbon monoxide is desirably used as the anode electrode, and platinum is desirably used as the cathode electrode.

The conditions of thermocompression bonding for obtaining the membrane-electrode assembly are a temperature of 100° C. (inclusive) to 180° C. (inclusive), a pressure of 10 to 200 Kg/cm$^2$, and a time of 1 min (inclusive) to 30 min (inclusive). If the pressure and temperature are low and the time is short (less than 10 kg/cm$^2$, less than 100° C., and less than 1 min), compression bonding becomes insufficient, which increases the resistance, so the cell characteristics may deteriorate. On the other hand, if the temperature and pressure are high and the time is long, deformation and decomposition of the solid film and deformation of the collector increase. Consequently, feed of fuel and an oxidizer is stopped, and the film may be destroyed. The cell characteristics also deteriorate.

Figure 10:
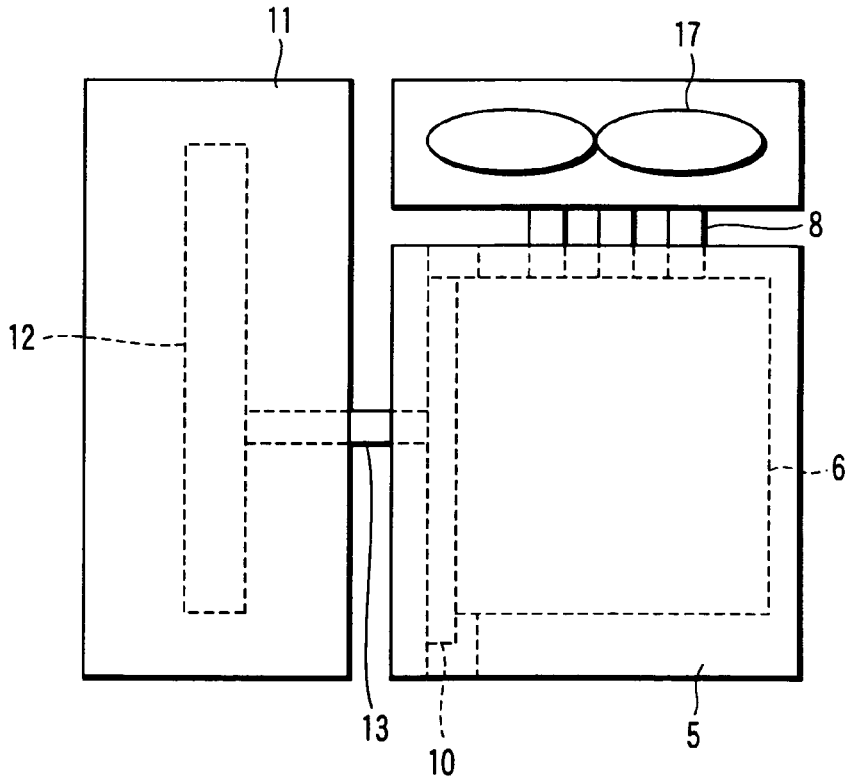
FIG. 10 is a top view of the fuel cell shown in FIG. 9.

A practical example of a methanol fuel cell as an example of the fuel cell according to the present invention will be described below with reference to FIGS. 9A, 9B and 10.

FIGS. 9A and 9B are a sectional view showing the arrangement of the main parts of a fuel cell used in examples of the present invention. FIG. 10 is a top view of the fuel cell shown in FIG. 9A.

An electrolyte layer 1 is provided between a fuel electrode (anode) 2 and an oxidizer electrode (cathode) 3. A membrane-electrode assembly 4 is formed by the electrolyte layer 1, fuel electrode 2, and oxidizer electrode 3. The fuel electrode 2 and oxidizer electrode 3 are made of, e.g., a conductive porous material so as to allow fuel and an oxidizer gas to flow and permit passage of electrons.

In the fuel cell of the present invention, each single cell comprises a fuel permeation unit 6 having a function for holding liquid fuel, and a fuel vaporizer 7 for feeding, to the fuel electrode 2, gas fuel formed by vaporizing the liquid fuel held in the fuel permeation unit 6. A stack 9 as a cell main body is formed by stacking, via separators 5, a plurality of layers of single cells each including the fuel permeation unit 6, fuel vaporizer 7, and membrane-electrode assembly 4. In that surface of the separator 5, which is in contact with the oxidizer electrode 3, an oxidizer gas feed channel 8 for feeding an oxidizer gas is formed.

As a means for feeding liquid fuel from a fuel tank 11 to the fuel permeation unit 6, a liquid fuel feed path 10 is formed in at least one side surface of the stack 9. One end of a feed pipe 13 is connected to the liquid fuel feed path 10, and the other end of the feed pipe 13 is connected to the lower end of a core 12 via a junction 14. Note that the core 12 is dipped in fuel such as a methanol aqueous solution. A circuit 15 is electrically connected to the stack main body 9 via a connector 16. A fan 17 is attached to a side surface of the stack main body 9. Liquid fuel introduced into the liquid fuel feed path 10 is fed from the side surface of the stack 9 to the fuel permeation unit 6, vaporized by the fuel vaporizer 7, and fed to the fuel electrode 2. If the fuel permeation unit 6 is formed by a member showing a capillary action, the liquid fuel can be fed to the fuel permeation unit 6 by the capillary force without using any auxiliary device. For this purpose, the liquid fuel introduced into the liquid fuel feed path 10 is brought into contact with the fuel permeation unit 6 end face.

When the stack 9 is formed by stacking single cells as shown in FIG. 9, the separator 5, fuel permeation unit 6, and fuel vaporizer 7 are formed by a conductive material, in order to achieve the function of a collector plate which conducts generated electrons. If necessary, a layered, island-like, or particulate catalyst layer is also formed between the fuel electrode 2 or the oxidizer electrode 3 and the electrolyte layer 1. However, the present invention is not limited by the presence/absence of this catalyst layer. The fuel electrode 2 or the oxidizer electrode 3 itself may also be used as a catalyst electrode. This catalyst electrode can be a single catalyst layer and can also have a multilayered structure in which a catalyst layer is formed on a substance such as conductive paper or cloth.

As described above, the separator 5 of this example also has the function of a channel which allows an oxidizer gas to flow. By using the part 5 (to be referred to as a channel/separator hereinafter) having the functions of both a separator and channel, it is possible to further reduce the number of parts and further downsize the fuel cell. A common channel can also be formed instead of the separator 5.

As a method of feeding the liquid fuel from the fuel storage tank to the liquid fuel feed path 10, it is possible to feed the liquid fuel in the fuel storage tank to the liquid fuel feed path 10 by gravity-drop. This method can reliably feed the liquid fuel to the liquid fuel feed path 10, although the method has the structural limit that the fuel storage tank must be installed in a position higher than the upper surface of the stack 9. Another method is to draw the liquid fuel from the fuel storage tank by the capillary force of the liquid fuel feed path 10. In this method, the connection between the fuel storage tank and the liquid fuel feed path 10, i.e., the position of a fuel feed port formed in the liquid fuel feed path 10 need not be higher than the upper surface of the stack 9. When this method is combined with the above gravity-drop method, the fuel tank can be installed in an arbitrary place.

It is, however, important to make the capillary force to the fuel permeation unit 6 larger than that of the liquid fuel feed path 10, in order for the liquid fuel introduced to the liquid fuel feed path 10 by the capillary force to be successively smoothly fed to the fuel permeation unit 6 by the capillary force. Note that the liquid fuel feed path 10 need not be singly formed along the side surface of the stack 9; another liquid fuel feed path 10 may also be formed in the other stack side surface.

The fuel storage tank as described above can be a detachable tank which can be detached from the cell main body. By replacing this fuel storage tank, the cell can be continuously operated for long time periods. Also, the liquid fuel can be fed from the fuel storage tank to the liquid fuel feed path 10 by gravity-drop as described above, by pushing the liquid fuel by the internal pressure of the tank, or by drawing the fuel by the capillary force of the liquid fuel feed path 10.

The liquid fuel introduced into the liquid fuel feed path 10 by any of the above methods is fed to the fuel permeation unit 6. The form of the fuel permeation unit 6 is not particularly limited as long as the fuel permeation unit 6 has a function of holding the liquid fuel inside and feeding only vaporized fuel to the fuel electrode 2 through the fuel vaporizer 7. For example, the fuel permeation unit 6 may comprise a liquid fuel passage and a vapor-liquid separating film at the interface with the fuel vaporizer 7. Furthermore, when the liquid fuel is to be fed to the fuel permeation unit 6 by the capillary force, the form of the fuel permeation unit 6 is not particularly limited as long as permeation of the liquid fuel is possible by the capillary force. For example, it is possible to use a porous material made up of particles or fillers, nonwoven fabric manufactured by a paper machine method or the like, or woven fabric formed by weaving fibers. A narrow gap formed between glass or plastic plates can also be used.

When a porous material is used as the fuel permeation unit 6, an example of the capillary force for drawing the liquid fuel toward the fuel permeation unit 6 is the capillary force of the porous material itself as the fuel permeation unit 6. When this capillary force is to be used, pores of the fuel permeation unit 6 made of the porous material are continuous pores, and the pore size of the continuous pores is controlled. In addition, communicating pores which continue from the side surface of the fuel permeation unit 6 that faces the liquid fuel feed path 10 to at least another side surface of the fuel permeation unit 6 are formed. This makes it possible to smoothly feed the liquid fuel by the capillary force even in a lateral direction.

The pore size and the like of the porous material as the fuel permeation unit 6 are not particularly limited as long as the liquid fuel in the liquid fuel feed path 10 can be drawn. However, the pore size is preferably about 0.01 to 150 µm when the capillary force of the liquid fuel feed path 10 is taken into consideration. Also, the pore volume which is an index of the continuity of pores in the porous material is favorably about 20 to 90%. If the pore size is less than 0.01 µm, the fuel permeation unit 6 becomes difficult to manufacture. If the pore size exceeds 150 µm, the capillary force lowers. If the pore volume is less than 20%, the amount of continuous pores reduces, and the amount of closed pores increases, so a satisfactory capillary force cannot be obtained. If the pore volume exceeds 90%, the fuel permeation unit 6 weakens and becomes difficult to manufacture, although the amount of continuous pores increases. In practice, the pore size is desirably 0.5 to 100 µm, and the pore volume is desirably 30 to 75%.

Examples of the present invention will be described in detail below with reference to the accompanying drawing.

First, a method of synthesizing an X element-containing carbon support used in the preparation of a cathode catalyst and anode catalyst will be explained.

<X Element-Containing Carbon Support>

Ten g of a carbon powder (PRINTEX 25 manufactured by Degussa, specific surface area=50 m$^2$/g) were placed in a stainless steel vessel. A cylindrical oven was evacuated, and air in the oven was replaced with argon so that no oxygen was contained. A gas mixture of hydrogen gas and ammonia gas (NH$_3$:H$_2$=1:4) was fed into the oven, the temperature of the oven was increased to 800° C., and the oven was held at 800° C. for 4 hrs. After that, the atmosphere in the oven was replaced with argon gas, and the temperature was lowered to room temperature, thereby obtaining an N element-containing carbon support weighing 10.2 g. The content of nitrogen was found to be 0.2 wt % by elemental analysis.

<B Element-Containing Carbon Support>

Ten g of a carbon powder (PRINTEX 25 manufactured by Degussa, specific surface area=50 m$^2$/g) were placed in a stainless steel vessel. A cylindrical oven was evacuated, and air in the oven was replaced with argon so that no oxygen was contained. A gas mixture of 200 ml/min of argon gas containing 9-borabicyclo[3,3,1]nonane obtained by bubbling argon gas in 9-borabicyclo[3,3,1]nonane and 1,000 ml/min of hydrogen was fed into the oven, the temperature of the oven was increased to 800° C., and the oven was held at 800° C. for 4 hrs. After that, the atmosphere in the oven was replaced with argon gas, and the temperature was lowered to room temperature, thereby obtaining a B element-containing carbon support weighing 10.1 g. The content of boron was found to be 0.15 wt % by elemental analysis.

<Synthesis of P Element-Containing Carbon Support>

Ten g of a carbon powder (PRINTEX 25 manufactured by Degussa, specific surface area=50 m$^2$/g) were placed in a stainless steel vessel. A cylindrical oven was evacuated, and air in the oven was replaced with argon so that no oxygen was contained. A gas mixture of 200 ml/min of argon gas containing phosphorus trichloride obtained by bubbling argon gas in phosphorus trichloride and 1,000 ml/min of hydrogen was fed into the oven, the temperature of the oven was increased to 800° C., and the oven was held at 800° C. for 4 hrs. After that, the atmosphere in the oven was replaced with argon gas, and the temperature was lowered to room temperature, thereby obtaining a P element-containing carbon support weighing 10.2 g. The content of phosphorus was found to be 0.23 wt % by elemental analysis.

Cathode catalysts 1N, 2N, 1B, 2B, 1P, and 2P were synthesized by methods explained below.

<Synthesis of Cathode Catalyst 1N>

Twenty g of the N element-containing carbon powder synthesized by the above method suspended in 1000 ml of water by using a homogenizer. This suspension was placed in a three-necked flask having a mechanical stirrer, reflux cooling pipe, and dropping funnel, and refluxed under stirring for 1 hr. Twenty minutes after 160 ml of an aqueous chloroplatinic acid solution (Pt=42 mg/ml) were added, a solution prepared by dissolving 21.0 g of sodium hydrogen carbonate in 600 ml of water was gradually dropped (the dropping time was about 60 min). After that, the resultant solution was refluxed for 2 hrs. The precipitate was transferred to a flask, refluxed over dilute sulfuric acid for 30 min, and filtered. The precipitate was then well washed with pure water, transferred to a flask, and refluxed over pure water for 30 min. After being filtered, the precipitate was well washed with pure water. This precipitate was dried at 100° C. The dried precipitate was placed in a high-purity zirconia boat and reduced in a cylindrical oven at 200° C. for 10 hrs by supplying 3% $H_2/N_2$ gas at a flow rate of 100 ml/min. After that, the temperature was returned to room temperature to obtain a catalyst weighing 24.1 g. Note that when taken out after being reduced, the catalyst was cooled with dry ice and given non-combustibility by $CO_2$.

The diameters of the catalyst particles were measured by transmission electron microscope (TEM) analysis. That is, five arbitrary different fields of the catalyst material was observed with a TEM, and the diameters of 20 particles were measured in each field. The average diameter was calculated by averaging the diameters of a total of 100 particles.

<Synthesis of Cathode Catalyst 1B>

A cathode catalyst 1B was synthesized following the same procedure as for the cathode catalyst 1N except that the B element-containing carbon support was used as a support.

<Synthesis of Cathode Catalyst 1P>

A cathode catalyst 1P was synthesized following the same procedure as for the cathode catalyst 1N except that the P element-containing carbon support was used as a support.

<Synthesis of Cathode Catalyst of Comparative Example 1>

A catalyst of Comparative Example 1 was synthesized following the same procedure as for the cathode catalyst 1N except that 20 g of carbon black (Printex 25 manufactured by Degussa, specific surface area=50 $m^2/g$) were used as a support. Note that when taken out after being reduced, the catalyst was cooled with dry ice and given non-combustibility by $CO_2$.

<Synthesis of Cathode Catalyst 2N>

Twenty g of a carbon powder (PRINTEX 25 manufactured by Degussa, specific surface area=50 $m^2/g$) suspended in 1,000 ml of water by using a homogenizer. This suspension was placed in a three-necked flask having a mechanical stirrer, reflux cooling pipe, and dropping funnel, and refluxed under stirring for 1 hr. Twenty minutes after 160 ml of an aqueous chloroplatinic acid solution (Pt=42 mg/ml) were added, a solution prepared by dissolving 21.0 g of sodium hydrogen carbonate in 600 ml of water was gradually dropped (the dropping time was about 60 min). After that, the resultant solution was refluxed for 2 hrs. The resultant material was filtered, and the precipitate was washed with pure water. This precipitate was transferred to a flask, and refluxed over pure water for 2 hrs. After being filtered, the precipitate was well washed with pure water. This precipitate was dried at 100° C. The dried precipitate was placed in a high-purity zirconia boat and reduced in a cylindrical oven at 200° C. for 10 hrs by supplying 3% $H_2/N_2$ gas at a flow rate of 100 ml/min. The gas was replaced with argon gas and then with a gas mixture of hydrogen gas/ammonia gas, and the temperature was raised to 600° C. and held at 600° C. for 4 hrs. After that, the temperature was returned to room temperature to obtain a catalyst weighing 24.3 g. Note that when taken out after being reduced, the catalyst was cooled with dry ice and given non-combustibility by $CO_2$.

<Synthesis of Cathode Catalyst 2B>

A cathode catalyst 2B was obtained following the same procedure as for the cathode catalyst 2N except that a gas mixture of 200 ml/min of argon gas containing 9-borabicyclo[3,3,1]nonane obtained by bubbling argon gas in 9-borabicyclo[3,3,1]nonane and 1,000 ml/min of hydrogen was used instead of the replacement with the gas mixture of hydrogen gas/ammonia gas.

<Synthesis of Cathode Catalyst 2P>

A cathode catalyst 2P was obtained following the same procedure as for the cathode catalyst 2N except that a gas mixture of 200 ml/min of argon gas containing phosphorus trichloride obtained by bubbling argon gas in phosphorus trichloride and 1,000 ml/min of hydrogen was used instead of the replacement with the gas mixture of hydrogen gas/ammonia gas.

Anode catalysts 1N, 2N, 1B, 2B, 1P, and 2P were synthesized by methods explained below.

<Synthesis of Cathode Catalyst 1NW>

Twenty grams of the synthesized N element-containing carbon powder suspended in 1000 ml of water by using a homogenizer. This suspension was placed in a three-necked flask having a mechanical stirrer, reflux cooling pipe, and dropping funnel, and refluxed under stirring for 1 hr. Three hundred twenty ml (W content=20 mg/ml) of a sodium tungstate aqueous solution were added, and 160 ml of chloroplatinic acid aqueous solution (Pt=42 mg/ml) were added over about 1 hr by dropping. Twenty minutes after that, a solution prepared by dissolving 18.0 g of sodium hydrogencarbonate in 600 ml of water was gradually dropped (the dropping time was about 120 min). After that, the resultant solution was refluxed for 2 hrs. The resultant material was filtered, and the precipitate was washed with pure water. The precipitate was transferred to a flask, and refluxed with 2 L of an aqueous sulfuric acid solution of about 0.01 mol for 2 hrs. The resultant material was filtered, the precipitate was well washed with pure water, and the precipitate was dried by a dryer at 100° C. The dried precipitate was placed in a high-purity quartz boat and reduced in a cylindrical oven at 800° C. for 10 hrs by supplying $H_2$ gas at a flow rate of 200 ml/min. After that, the temperature was returned to room temperature to obtain a catalyst weighing 28.1 g. Note that when taken out after being reduced, the catalyst was cooled with dry ice and given non-combustibility by $CO_2$.

When surface analysis was performed for the Pt—W particles by XPS (X-ray Photoelectron Spectroscopy), the ratio (Pt/W) of the number of Pt atoms to the number of W atoms was 2.63, indicating that the number of Pt atoms was larger than that of W atoms on the surface of the Pt—W particle. In addition, when elemental analysis was performed, the ratio (Pt/W) of the total number of Pt atoms to that of W atoms was 1.02, showing that the Pt—W particles satisfied the relationship of expression (2) presented earlier. Since the number-of-atoms ratio on the surface was higher than the total-number-of-atoms ratio, it was determined that the Pt—W particles also satisfied the relationship of expression (1) presented earlier.

<Synthesis of Cathode Catalyst 2NW>

Twenty g of the synthesized N element-containing carbon powder suspended in 1,000 ml of water by using a homogenizer. This suspension was placed in a three-necked flask having a mechanical stirrer, reflux condenser, and dropping funnel, and refluxed under stirring for 1 hr. Three hundred twenty ml (W content=20 mg/ml) of an aqueous sodium tungstate solution were added, and 340 ml of 0.2-mol hydrochloric acid were gradually dropped (the dropping time was about 120 min). After that, the resultant solution was refluxed for 2 hrs. The resultant material was filtered, and the precipitate was washed with pure water. The precipitate was transferred to a flask, and refluxed with 2 L of an aqueous sulfuric acid solution of about 0.01 mol for 2 hrs. The resultant material was filtered, the precipitate was well washed with pure water, and the precipitate was dried by a dryer at 100° C. The dried precipitate was dispersed in water, and the dispersion was placed in a three-necked flask having a mechanical stirrer, reflux condenser, and dropping funnel, and refluxed under stirring for 1 hr. One hundred sixty ml of an aqueous chloroplatinic acid solution (Pt=42 mg/ml) were added over about 1 hr by dropping. Twenty minutes after that, a solution prepared by dissolving 18.0 g of sodium hydrogen carbonate in 600 ml of water was gradually dropped (the dropping time was about 120 min). After that, the resultant solution was refluxed for 2 hrs. The resultant material was filtered, and the precipitate was washed with pure water. The precipitate was transferred to a flask, and refluxed with 2 L of an aqueous sulfuric acid solution of about 0.01 mol for 2 hrs. The resultant material was filtered, the precipitate was well washed with pure water, and the precipitate was dried by a dryer at 100° C.

The dried precipitate was placed in a high-purity quartz boat and reduced in a cylindrical oven at 800° C. for 10 hrs by feeding $H_2$ gas at a flow rate of 200 ml/min. After that, the temperature was returned to room temperature to obtain a catalyst weighing 30.1 g. Note that when taken out after being reduced, the catalyst was cooled with dry ice and given non-combustibility by $CO_2$.

When surface analysis was performed for the Pt—W particles by XPS (X-ray Photoelectron Spectroscopy), the ratio (Pt/W) of the number of Pt atoms to the number of W atoms was 2.86, indicating that the number of Pt atoms was larger than that of W atoms on the surface of the Pt—W particle. In addition, when elemental analysis was performed, the ratio (Pt/W) of the total number of Pt atoms to that of W atoms was 0.98, showing that the Pt—W particles satisfied the relationship of expression (2). Since the number-of-atoms ratio on the surface was higher than the total-number-of-atoms ratio, it was determined that the Pt—W particles also satisfied the relationship of expression (1).

<Synthesis of Cathode Catalyst 1NM>

A catalyst weighing 26.5 g was obtained following the same procedure as for the cathode catalyst 1NW except that 160 ml of ammonium molybdate (Mo content=40 mg/ml) were used instead of the sodium tungstate.

When surface analysis was performed for the Pt—Mo particles by XPS (X-ray Photoelectron Spectroscopy), the ratio (Pt/Mo) of the number of Pt atoms to the number of Mo atoms was 3.65, indicating that the number of Pt atoms was larger than that of Mo atoms on the surface of the Pt—Mo particle. In addition, when elemental analysis was performed, the ratio (Pt/Mo) of the total number of Pt atoms to that of Mo atoms was 1.07, showing that the Pt—Mo particles satisfied the relationship of expression (2). Since the number-of-atoms ratio on the surface was higher than the total-number-of-atoms ratio, it was determined that the Pt—Mo particles also satisfied the relationship of expression (1).

<Synthesis of Anode Catalyst of Comparative Example 1>

An anode catalyst of Comparative Example 1 was synthesized following the same procedure as for the cathode catalyst of Comparative Example 1 described previously, except that 80 ml of an aqueous chloroplatinic acid solution and 40 ml of an aqueous ruthenium chloride solution (Ru=43 mg/ml) were used instead of 160 ml of an aqueous chloroplatinic acid solution.

<Synthesis of Anode Catalyst 1N>

An anode catalyst 1N was synthesized following the same procedure as for the cathode catalyst 1N except that 80 ml of an aqueous chloroplatinic acid solution and 40 ml of an aqueous ruthenium chloride solution (Ru=43 mg/ml) were used instead of 160 ml of an aqueous chloroplatinic acid solution.

<Synthesis of Anode Catalyst 1B>

An anode catalyst 1B was synthesized following the same procedure as for the anode catalyst 1N except that the B element-containing carbon support was used as a support.

<Synthesis of Anode Catalyst 1P>

An anode catalyst 1P was synthesized following the same procedure as for the anode catalyst 1N except that the P element-containing carbon support was used as a support.

<Synthesis of Anode Catalyst 2N>

An anode catalyst 2N was synthesized following the same procedure as for the cathode catalyst 2N except that 80 ml of an aqueous chloroplatinic acid solution and 40 ml of an aqueous ruthenium chloride solution (Ru=43 mg/ml) were used instead of 160 ml of an aqueous chloroplatinic acid solution.

<Synthesis of Anode Catalyst 2B>

An anode catalyst 2B was synthesized following the same procedure as for the anode catalyst 2N except that the B element-containing carbon support was used as a support.

<Synthesis of Anode Catalyst 2P>

An anode catalyst 2P was synthesized following the same procedure as for the anode catalyst 2N except that the P element-containing carbon support was used as a support.

Cathode electrodes and anode electrodes were manufactured by using the cathode catalysts and anode catalysts synthesized by the above methods.

<Synthesis of Anode Catalyst 1NW>

An anode catalyst 1NW was formed following the same procedure as for the cathode catalyst 1NW except that 80 ml of an aqueous chloroplatinic acid solution and 40 ml of aqueous ruthenium chloride solution (Ru content=43 mg/ml) were used instead of 160 ml of an aqueous chloroplatinic acid solution (Pt content=42 mg/ml).

When surface analysis was performed for the Pt—Ru—W particles by XPS (X-ray Photoelectron Spectroscopy), the ratio {Pt/(Ru+W)} of the number of Pt atoms to that of Ru and W atoms was 2.3, indicating that the number of Pt atoms was larger than that of Ru and W atoms on the surface of the Pt—Ru—W particle. In addition, when elemental analysis was performed, the ratio {Pt/(Ru+W)} of the total number of Pt atoms to that of Ru and W atoms was 1.07, showing that the Pt—Ru—W particles satisfied the relationship of expression (2). Since the number-of-atoms ratio on the surface was higher than the total-number-of-atoms ratio, it was determined that the Pt—Ru—W particles also satisfied the relationship of expression (1).

<Synthesis of Anode Catalyst 1NM>

An anode catalyst 1NM was formed following the same procedure as for the cathode catalyst 1NM except that 80 ml of an aqueous chloroplatinic acid solution and 40 ml of an aqueous ruthenium chloride solution (Ru content=43 mg/ml) were used instead of 160 ml of an aqueous chloroplatinic acid solution (Pt content=42 mg/ml).

When surface analysis was performed for the Pt—Ru—Mo particles by XPS (X-ray Photoelectron Spectroscopy), the ratio {Pt/(Ru+Mo)} of the number of Pt atoms to that of Ru and Mo atoms was 3.23, indicating that the number of Pt atoms was larger than that of Ru and Mo atoms on the surface of the Pt—Ru—Mo particle. In addition, when elemental analysis was performed, the ratio {Pt/(Ru+Mo)} of the total number of Pt atoms to that of Ru and Mo atoms was 1.07, showing that the Pt—Ru—Mo particles satisfied the relationship of expression (2). Since the number-of-atoms ratio on the surface was higher than the total-number-of-atoms ratio, it was determined that the Pt—Ru—Mo particles also satisfied the relationship of expression (1).

<Formation of Cathode Electrode 1N>

One g of the cathode catalyst 1N, 2 g of pure water, 25 g of zirconia balls 5 mm in diameter, and 50 g of zirconia balls 10 mm in diameter were placed in a 50-ml polyethylene vessel and well stirred. In addition, 4.5 g of a 20% NAFION solution and 10 g of 2-ethoxyethanol were added, and the resultant solution was well stirred. After that, one g of graphite (average particle size=3 μm) was added and dispersed for 6 hrs by a bench ball mill, thereby forming a slurry composition. Water-repellent carbon paper (270 μm, manufactured by TORAY INDUSTRIES) was coated with the slurry composition by using a control coater (gap=750 μm), and the resultant material was air-dried to form a cathode electrode 1N. The thickness of the catalyst layer was 110 μm.

<Formation of Cathode Electrode 1B>

A cathode electrode 1B was formed following the same procedure as for the cathode electrode 1N except that the cathode catalyst 1B was used instead of the cathode catalyst 1N.

<Formation of Cathode Electrode 1P>

A cathode electrode 1P was formed following the same procedure as for the cathode electrode 1N except that the cathode catalyst 1P was used instead of the cathode catalyst 1N.

<Formation of Cathode Electrode 2N>

A cathode electrode 2N was formed following the same procedure as for the cathode electrode 1N except that the cathode catalyst 2N was used instead of the cathode catalyst 1N, and the thickness of the catalyst layer was changed to 100 μm.

<Formation of Cathode Electrode 2B>

A cathode electrode 2B was formed following the same procedure as for the cathode electrode 1N except that the cathode catalyst 2B was used instead of the cathode catalyst 1N, and the thickness of the catalyst layer was changed to 100 μm.

<Formation of Cathode Electrode 2P>

A cathode electrode 2P was formed following the same procedure as for the cathode electrode 1N except that the cathode catalyst 2P was used instead of the cathode catalyst 1N, and the thickness of the catalyst layer was changed to 100 μm.

<Formation of Cathode Electrode 1NW>

A cathode electrode 1NW was formed following the same procedure as for the cathode electrode 1N except that the cathode catalyst 1NW was used instead of the cathode catalyst 1N. Note that the thickness of the catalyst layer was changed to 95 μm.

<Formation of Cathode Electrode 1NM>

A cathode electrode 1NM was formed following the same procedure as for the cathode electrode 1N except that the cathode catalyst 1NM was used instead of the cathode catalyst 1N. Note that the thickness of the catalyst layer was changed to 90 μm.

<Formation of Cathode Electrode 2NW>

A cathode electrode 2NW was formed following the same procedure as for the cathode electrode 1N except that the cathode catalyst 2NW was used instead of the cathode catalyst 1N. Note that the thickness of the catalyst layer was changed to 95 μm.

<Formation of Cathode Electrode of Comparative Example 1>

A cathode electrode of Comparative Example 1 was formed following the same procedure as for the cathode electrode 1N except that 2 g of the cathode catalyst of Comparative Example 1 were used, and the thickness of the catalyst layer was changed to 100 μm.

<Formation of Anode Electrode 1N>

One g of the anode catalyst 1N, 2 g of pure water, 25 g of zirconia balls 5 mm in diameter, and 50 g of zirconia balls 10 mm in diameter were placed in a 50-ml polyethylene vessel and well stirred. In addition, 4.5 g of a 20% NAFION solution and 10 g of 2-ethoxyethanol were added, and the resultant solution was well stirred. After that, one g of graphite (average particle size=3 μm) was added and dispersed for 6 hrs by a bench ball mill, thereby forming a slurry composition. Water-repellent carbon paper (350 μm, manufactured by TORAY INDUSTRIES) was coated with the slurry composition by using a control coater (gap=900 μm), and the resultant material was air-dried to form an anode electrode 1N. The thickness of the catalyst layer was 170 μm.

<Formation of Anode Electrode 1B>

An anode electrode 1B was formed following the same procedure as for the anode electrode 1N except that the anode catalyst 1B was used instead of the anode catalyst 1N, and the thickness of the catalyst layer was changed to 130 μm.

<Formation of Anode Electrode 1P>

An anode electrode 1P was formed following the same procedure as for the anode electrode 1N except that the anode catalyst 1P was used instead of the anode catalyst 1N, and the thickness of the catalyst layer was changed to 130 µm.

<Formation of Anode Electrode 2N>

An anode electrode 2N was formed following the same procedure as for the anode electrode 1N except that the anode catalyst 2N was used instead of the anode catalyst 1N, and the thickness of the catalyst layer was changed to 150 µm.

<Formation of Anode Electrode 2B>

An anode electrode 2B was formed following the same procedure as for the anode electrode 1N except that the anode catalyst 2B was used instead of the anode catalyst 1N, and the thickness of the catalyst layer was changed to 135 µm.

<Formation of Anode Electrode 2P>

An anode electrode 2P was formed following the same procedure as for the anode electrode 1N except that the anode catalyst 2P was used instead of the anode catalyst 1N, and the thickness of the catalyst layer was changed to 140 µm.

<Formation of Anode Electrode 1NW>

An anode electrode 1NW was formed following the same procedure as for the anode electrode 1N except that the anode catalyst 1NW was used instead of the anode catalyst 1N. Note that the thickness of the catalyst layer was changed to 110 µm.

<Formation of Anode Electrode 1NM>

An anode electrode 1NM was formed following the same procedure as for the anode electrode 1N except that the anode catalyst 1NM was used instead of the anode catalyst 1N. Note that the thickness of the catalyst layer was changed to 120 µm.

<Formation of Anode Electrode of Comparative Example 1>

An anode electrode of Comparative Example 1 was formed following the same procedure as for the anode electrode 1N except that 2 g of the anode catalyst of Comparative Example 1 were used.

Fuel cells were manufactured by methods explained below by using the obtained cathode electrodes and anode electrodes.

EXAMPLE 1

Each of the cathode electrode 1N and anode electrode 1N was cut into a square piece of 3.2×3.2 cm so that the electrode area was 10 cm$^2$. NAFION 117 was sandwiched as a proton conductive solid polymer film between the cathode electrode 1N and anode electrode 1N. The resultant structure was bonded by thermocompression bonding at a pressure of 100 kg/cm$^2$ at 125° C. for 30 min, thereby forming a membrane-electrode assembly (MEA). A 2M methanol aqueous solution as fuel was fed to the anode electrode at a flow rate of 0.6 ml/min., and air was fed to the cathode electrode at 60 ml/min. In this state, the open circuit voltage (OCV) of the fuel cell (single cell) was measured, and the single cell voltage (driving voltage) when the current density was 100 mA/cm$^2$ was also measured. The results are shown in Table 1 (to be presented later).

EXAMPLES 2–16 & 1a–1c

Fuel cells were manufactured and the open circuit voltage and driving voltage of each cell were measured following the same procedures as in Example 1 except that the types of cathode electrodes and anode electrodes were changed as shown in Table 1.

EXAMPLE 17

<Formation of Cathode Electrode Composition Sheet>

Two of the cathode catalyst 2N and 2 g of water were mixed in an agate mortar. Two g of graphite, 4 g of diethyleneglycol, and 0.5 g of lithium carbonate were further added and kneaded. After that, 1.5 g of a PTFE dispersion (PTEF solid component=60 wt %) were added and kneaded to obtain a solid product. A sheet is formed by stretching this solid product. The film thickness was about 80 µm. The sheet was dipped in 6N sulfuric acid to form pores and washed with water several times. Then, the sheet was dipped in a NAFION solution and impregnated with NAFION at a reduced pressure. The resultant sheet was dried to obtain a cathode electrode composition sheet.

<Formation of Anode Electrode Composition Sheet>

An anode electrode composition sheet was obtained following the same procedure as for the cathode electrode except that the anode catalyst 2N was used instead of the cathode catalyst 2N.

Water-repellent carbon paper, the cathode electrode composition sheet, NAFION 117, the anode electrode composition sheet, and water-repellent carbon paper were stacked in this order, and bonded by thermocompression bonding at a pressure of 100 kg/cm$^2$ at 125° C. for 30 min, thereby forming a membrane-electrode assembly (MEA). A 2M methanol aqueous solution as fuel was fed to the anode electrode at a flow rate of 0.6 ml/min., and air was fed to the cathode electrode at 60 ml/min. In this state, the open circuit voltage (OCV) of the fuel cell (single cell) was measured, and the single cell voltage (driving voltage) when the current density was 100 mA/cm$^2$ was also measured. The results are shown in Table 1.

COMPARATIVE EXAMPLE 1

A fuel cell was manufactured and the open circuit voltage and driving voltage of the cell were measured following the same procedures as in Example 1 except that the cathode electrode and anode electrode of Comparative Example 1 were used.

TABLE 1

| | | Cathode electrode | | | Anode electrode | | | Voltage (V) | |
|---|---|---|---|---|---|---|---|---|---|
| | | Element X | Catalyst particles | Synthesis method | Element X | Catalyst particles | Synthesis method | OCV (V) | at 100 mA/cm$^2$ |
| Example 1 | 1 N | N | Pt | I | 1 N | N | Pt—Ru | I | 0.62 | 0.19 |
| Example 2 | 2 N | N | Pt | II | 1 N | N | Pt—Ru | I | 0.61 | 0.18 |

TABLE 1-continued

|  |  | Cathode electrode | | | Anode electrode | | | Voltage (V) | |
| --- | --- | --- | --- | --- | --- | --- | --- | --- | --- |
|  |  | Element X | Catalyst particles | Synthesis method | Element X | Catalyst particles | Synthesis method | OCV (V) | at 100 mA/cm² |
| Example 3 | 1 N | N | Pt | I | 2 N | N | Pt—Ru | II | 0.65 | 0.19 |
| Example 4 | 2 N | N | Pt | II | 2 N | N | Pt—Ru | II | 0.62 | 0.23 |
| Example 5 | 1 B | B | Pt | I | 1 N | N | Pt—Ru | I | 0.68 | 0.25 |
| Example 6 | 1 P | P | Pt | I | 1 N | N | Pt—Ru | I | 0.62 | 0.20 |
| Example 7 | 2 B | B | Pt | II | 2 N | N | Pt—Ru | II | 0.64 | 0.19 |
| Example 8 | 2 P | P | Pt | II | 2 N | N | Pt—Ru | II | 0.64 | 0.21 |
| Example 9 | 1 B | B | Pt | I | 1 P | P | Pt—Ru | I | 0.63 | 0.19 |
| Example 10 | 2 B | B | Pt | II | 1 P | P | Pt—Ru | I | 0.62 | 0.20 |
| Example 11 | 1 N | N | Pt | I | 2 B | B | Pt—Ru | II | 0.65 | 0.19 |
| Example 12 | 2 N | N | Pt | II | 2 B | B | Pt—Ru | II | 0.67 | 0.23 |
| Example 13 | 1 P | P | Pt | I | 1 B | B | Pt—Ru | I | 0.66 | 0.23 |
| Example 14 | 2 P | P | Pt | II | 2 B | B | Pt—Ru | II | 0.67 | 0.24 |
| Example 15 | 1 B | B | Pt | I | 1 B | B | Pt—Ru | I | 0.65 | 0.21 |
| Example 16 | 1 P | P | Pt | I | 2 P | P | Pt—Ru | II | 0.64 | 0.23 |
| Example 17 | 2 N | N | Pt | II | 2 N | N | Pt—Ru | II | 0.63 | 0.22 |
| Example 1a | 1 NW | N | Pt—W | I | 1 NW | N | Pt—Ru—W | I | 0.65 | 0.24 |
| Example 1b | 1 NM | N | Pt—Mo | I | 1 NM | N | Pt—Ru—Mo | I | 0.62 | 0.22 |
| Example 1c | 2 NW | N | Pt—W | I | 1 NW | N | Pt—Ru—W | I | 0.65 | 0.25 |
| Comparative Example 1 | — | No addition | Pt | — | — | No addition | Pt—Ru | — | 0.51 | 0.08 |

Synthesis method I After element X was introduced into carbon, catalyst was supported;
Synthesis method II After catalyst was supported on support, element X was introduced As shown in Table 1, the single cell open circuit voltage and driving voltage of each of the fuel cells of Examples 1 to 17 and 1a to 1c including the carbon support containing at least one element selected from the group consisting of B, N, and P were higher than those of the fuel cell of Comparative Example 1 using the carbon support to which none of B, N, and P was added.

Methods of synthesizing cathode catalysts and anode catalysts will be explained below.

<Synthesis of Cathode Catalyst 1SA>

Twenty g of an $SiO_2$—$Al_2O_3$ powder (MOX170 manufactured by Aerosil, specific surface area=170 m²/g, $Al_2O_3$ content=10%) suspended in 1,000 ml of water by using a homogenizer. This suspension was placed in a three-necked flask having a mechanical stirrer, reflux cooling pipe, and dropping funnel, and refluxed under stirring for 1 hr. Twenty minutes after 80 ml of an aqueous chloroplatinic acid solution (Pt=42 mg/ml) and 80 ml of a 0.1M hydrochloric acid solution of iron(II) chloride (0.21 mol/l) were added, a solution prepared by dissolving 12.8 g of sodium hydrogencarbonate in 600 ml of water was gradually dropped (the dropping time was about 3 hrs). After that, the resultant solution was refluxed for 2 hrs. The resultant material was filtered, and the precipitate was washed with pure water. This precipitate was transferred to a flask, and 1 L of sulfuric acid of about 1% was added. After the resultant solution was refluxed for 1 hr, the precipitate was filtered and washed. The filtered precipitate was transferred to a flask, and refluxed over pure water for 1 hr. The resultant material was filtered, the precipitate was well washed with pure water, and the precipitate was dried by a dryer at 100° C. The dried precipitate was placed in a high-purity zirconia boat and reduced in a cylindrical oven at 200° C. for 10 hrs by feeding 3% $H_2/N_2$ gas at a flow rate of 100 ml/min. After that, the temperature was returned to room temperature to obtain a catalyst weighing 24.1 g.

Subsequently, this catalyst was placed in a quartz boat, set in an oven, and air in the oven was well replaced with argon. After that, the temperature was raised to 500° C. in the argon atmosphere, argon was replaced with hydrogen, and the temperature was further raised to 700° C. A gas mixture of hydrogen and ethylene (1,000 ml/min. of hydrogen:200 ml/min. of ethylene) was supplied, and the temperature was held at 700° C. for 1 hr, thereby synthesizing carbon fibers and carbon tubes. After the gas mixture was replaced with argon gas, the temperature was lowered to room temperature to obtain a cathode catalyst 1SA.

<Synthesis of Cathode Catalyst 1ST>

Twenty g of an $SiO_2$ powder (specific surface area=80 m²/g) were added to and well dispersed in 1,000 ml of methanol. Two g of tetrabutoxytitanium dissolved in methanol were added, and the resultant solution was well stirred. After that, 10 g of pure water were gradually added to cause a reaction for 3 hrs. Subsequently, the solid component was filtered to obtain a solid product. This solid product was dried at 120° C. for 10 hrs, pulverized, placed in an alumina boat, and heated in air at 300° C. for 2 hrs and then at 700° C. for 1 hr. The resultant material was cooled to obtain an $SiO_2$—$TiO_2$ composite powder.

A cathode catalyst 1ST was obtained following the same procedure as for the cathode catalyst 1SA except that the $SiO_2$—$TiO_2$ composite powder was used instead of the $SiO_2$—$Al_2O_3$ powder.

<Synthesis of Cathode Catalyst 1TW>

Twenty g of a $TiO_2$ powder (specific surface area=50 m²/g) were added to and well dispersed in 500 ml of methanol. Four g of sodium tungstate dissolved in pure water were added, and the resultant solution was well stirred. After that, dilute nitric acid was gradually added to make the solution acidic and cause a reaction for 3 hrs. The reaction product was filtered to obtain a solid product. This solid product was dried at 120° C. for 10 hrs, pulverized, placed in an alumina boat, and heated in air at 300° C. for 2 hrs and then at 700° C. for 1 hr. The resultant material was cooled to obtain a $TiO_2$—$WO_3$ composite powder.

A cathode catalyst 1TW was obtained following the same procedure as for the cathode catalyst 1SA except that the $TiO_2$—$WO_3$ composite powder was used instead of the $SiO_2$—$Al_2O_3$ powder.

<Synthesis of Cathode Catalyst 1ZW>

Twenty g of a $ZrO_2$ powder (specific surface area=40 $m^2/g$) were added to and well dispersed in 500 ml of pure water. Three g of sodium tungstate dissolved in pure water were added, and the resultant solution was well stirred. After that, dilute nitric acid was gradually added to make the solution acidic and cause a reaction for 3 hrs. The reaction product was filtered to obtain a solid product. This solid product was dried at 120° C. for 10 hrs, pulverized, placed in an alumina boat, and heated in air at 300° C. for 2 hrs and then at 700° C. for 1 hr. The resultant material was cooled to obtain a $ZrO_2$—$WO_3$ composite powder.

A cathode catalyst 1ZW was obtained following the same procedure as for the cathode catalyst 1SA except that the $ZrO_2$—$WO_3$ composite powder was used instead of the $SiO_2$—$Al_2O_3$ powder.

<Synthesis of Cathode Catalyst 1ZM>

Twenty g of a $ZrO_2$ powder (specific surface area=40 $m^2/g$) were added to and well dispersed in 500 ml of methanol. Three g of sodium molybdate dissolved in pure water were added, and the resultant solution was well stirred. After that, dilute nitric acid was gradually added to make the solution acidic and cause a reaction for 3 hrs. The reaction product was filtered to obtain a solid product. This solid product was dried at 120° C. for 10 hrs, pulverized, placed in an alumina boat, and heated in air at 300° C. for 2 hrs and then at 700° C. for 1 hr. The resultant material was cooled to obtain a $ZrO_2$—$MoO_3$ composite powder.

A cathode catalyst 1ZM was obtained following the same procedure as for the cathode catalyst 1SA except that the $ZrO_2$—$MoO_3$ composite powder was used instead of the $SiO_2$—$Al_2O_3$ powder.

<Synthesis of Cathode Catalyst 1Co>

A cathode catalyst 1Co was obtained following the same procedure as for the cathode catalyst 1SA except that 80 ml of an aqueous 0.21M cobalt(II) chloride solution were used instead of 80 ml of the aqueous 0.21M iron(II) chloride solution.

<Synthesis of Cathode Catalyst 1Ni>

A cathode catalyst 1Ni was obtained following the same procedure as for the cathode catalyst 1SA except that 80 ml of an aqueous 0.21M nickel(II) chloride solution were used instead of 80 ml of the aqueous 0.21M iron(II) chloride solution.

<Synthesis of Cathode Catalyst 1SS>

Twenty g of a $SiO_2$ powder (specific surface area=50 $m^2/g$) were added to and well dispersed in 500 ml of water. Five g of tin(IV) chloride dissolved in pure water were added, and the resultant solution was well stirred. After that, dilute $NaHCO_3$ was gradually added to make the solution slightly alkaline (pH was about 8) and cause a reaction at 60° C. for 3 hrs. The reaction product was filtered to obtain a solid product. This solid product was dried at 120° C. for 10 hrs, pulverized, placed in an alumina boat, and heated in air at 300° C. for 2 hrs and then at 700° C. for 1 hr. The resultant material was cooled to obtain an $SiO_2$—$SnO_2$ composite powder.

A cathode catalyst 1SS was obtained following the same procedure as for the cathode catalyst 1SA except that the $SiO_2$—$SnO_2$ composite powder was used instead of the $SiO_2$—$Al_2O_3$ powder.

<Synthesis of Cathode Catalyst 1SMn>

Twenty g of an $SiO_2$—$MnO_2$ powder (specific surface area=70 $m^2/g$, $MnO_2$ content=10%) suspended in 1,000 ml of water by using a homogenizer. This suspension was placed in a three-necked flask having a mechanical stirrer, reflux cooling pipe, and dropping funnel, and refluxed under stirring for 1 hr. Twenty minutes after 80 ml of an aqueous chloroplatinic acid solution (Pt content=42 mg/ml) were added, a solution prepared by dissolving 10.8 g of sodium hydrogen carbonate in 600 ml of water was gradually dropped (the dropping time was about 3 hrs). After that, the resultant solution was refluxed for 2 hrs. The resultant material was filtered, and the precipitate was washed with pure water. This precipitate was transferred to a flask, and 1 L of sulfuric acid of about 1% was added. After the resultant solution was refluxed for 1 hr, the precipitate was filtered and washed. The filtered precipitate was transferred to a flask, and refluxed over pure water for 1 hr. The resultant material was filtered, the precipitate was well washed with pure water, and the precipitate was dried by a dryer at 100° C. The dried precipitate was placed in a high-purity zirconia boat and reduced in a cylindrical oven at 200° C. for 10 hrs by supplying 3% $H_2/N_2$ gas at a flow rate of 100 ml/min. After that, the temperature was returned to room temperature to obtain a catalyst weighing 24.1 g.

Subsequently, this catalyst was placed in a quartz boat, set in an oven, and air in the oven was well replaced with argon. After that, the temperature was raised to 500° C. in the argon atmosphere, argon was replaced with hydrogen, and the temperature was further raised to 700° C. A gas mixture of hydrogen and ethylene (1,000 ml/min. of hydrogen:200 ml/min. of ethylene) was supplied, and the temperature was held at 700° C. for 1 hr, thereby synthesizing carbon fibers and carbon tubes. After the gas mixture was replaced with argon gas, the temperature was lowered to room temperature to obtain a cathode catalyst 1SMn.

<Synthesis of Cathode Catalyst 1S>

A cathode catalyst 1S was obtained following the same procedure as for 1SMn except that $SiO_2$ (specific surface area=50 $m^2/g$) was used as a support instead of $SiO_2$—$MnO_2$.

<Synthesis of Cathode Catalyst 1T>

A cathode catalyst 1T was obtained following the same procedure as for 1SMn except that $TiO_2$ (specific surface area=50 $m^2/g$) was used as a support instead of $SiO_2$—$MnO_2$.

<Synthesis of Cathode Catalyst 1M>

A cathode catalyst 1M was obtained following the same procedure as for 1Co except that $WO_3$ (specific surface area=40 $m^2/g$) was used as a support instead of $SiO_2$—$Al_2O_3$.

<Synthesis of Cathode Catalyst 1W>

A cathode catalyst 1W was obtained following the same procedure as for 1SMn except that $WO_3$ (specific surface area=45 $m^2/g$) was used as a support instead of $SiO_2$—$MnO_2$.

<Synthesis of Cathode Catalyst 1Sn>

A cathode catalyst 1Sn was obtained following the same procedure as for 1SMn except that $SnO_2$ (specific surface area=55 $m^2/g$) was used as a support instead of $SiO_2$—$MnO_2$.

<Synthesis of Cathode Catalyst 1SR>

A cathode catalyst 1SR was obtained following the same procedure as for 1SMn except that $SiO_2$—$ReO_2$ (RE content=15%, specific surface area=50 m²/g) was used as a support instead of $SiO_2$—$MnO_2$.

<Synthesis of Cathode Catalyst of Comparative Example 2>

Twenty g of a carbon powder (PRINTEX manufactured by Degussa, specific surface area=50 m²/g) suspended in 1,000 ml of water by using a homogenizer. This suspension was placed in a three-necked flask having a mechanical stirrer, reflux condenser, and dropping funnel, and refluxed under stirring for 1 hr. Twenty minutes after 160 ml of an aqueous chloroplatinic acid solution (Pt=42 mg/ml) and 80 ml of iron(II) chloride (2 mmol/l) were added, a solution prepared by dissolving 21.0 g of sodium hydrogen carbonate in 600 ml of water was gradually dropped (the dropping time was about 3 hrs). After that, the resultant solution was refluxed for 2 hrs. The resultant material was filtered, and the precipitate was washed with pure water. This precipitate was transferred to a flask, and 1 L of sulfuric acid of about 1% was added. After the resultant solution was refluxed for 1 hr, the precipitate was filtered and washed. The filtered precipitate was transferred to a flask, and refluxed over pure water for 1 hr. The resultant material was filtered, the precipitate was well washed with pure water, and the precipitate was dried by a dryer at 100° C. The dried precipitate was placed in a high-purity zirconia boat and reduced in a cylindrical oven at 200° C. for 10 hrs by supplying 3% $H_2/N_2$ gas at a flow rate of 100 ml/min. After that, the temperature was returned to room temperature to obtain a catalyst weighing 24.1 g.

<Synthesis of Cathode Catalyst 2SA>

A cathode catalyst 2SA was obtained following the same procedure as for the cathode catalyst 2SA except that 20 g of MOX80 (specific surface area=80 m²/g, $Al_2O_3$ content=1%) manufactured by Aerosil were used as an $SiO_2$—$Al_2O_3$ powder.

<Synthesis of Anode Catalyst of Comparative Example 2>

An anode catalyst of Comparative Example 2 was obtained following the same procedure as for the cathode catalyst of Comparative Example 2 except that 120 ml of an aqueous chloroplatinic acid solution and 60 ml of an aqueous ruthenium chloride solution (Ru=43 mg/ml) were used instead of 160 ml of an aqueous chloroplatinic acid solution.

<Synthesis of Anode Catalyst 1SA>

Twenty g of an $SiO_2$—$Al_2O_3$ powder (MOX170 manufactured by Aerosil, specific surface area=180 m²/g) suspended in 1,000 ml of water by using a homogenizer. This suspension was placed in a three-necked flask having a mechanical stirrer, reflux condenser, and dropping funnel, and refluxed under stirring for 1 hr. Twenty minutes after 240 ml of an aqueous chloroplatinic acid solution (Pt content=42 mg/ml) and 120 ml of ruthenium chloride (Ru content=42 mg/ml) were added, a solution prepared by dissolving 37.0 g of sodium hydrogen carbonate in 700 ml of water was gradually dropped (the dropping time was about 3 hrs). After that, the resultant solution was refluxed for 2 hrs. The resultant material was filtered, and the precipitate was washed with pure water. This precipitate was transferred to a flask, and 1 L of sulfuric acid of about 0.1% was added. After the resultant solution was refluxed for 1 hr, the precipitate was filtered and washed. The filtered precipitate was transferred to a flask, and refluxed over pure water for 1 hr. The resultant material was filtered, the precipitate was well washed with pure water, and the precipitate was dried by a dryer at 100° C. The dried precipitate was placed in a high-purity zirconia boat and reduced in a cylindrical oven at 200° C. for 10 hrs by supplying 3% $H_2/N_2$ gas at a flow rate of 100 ml/min. After that, the temperature was returned to room temperature to obtain a catalyst weighing 29.1 g.

Subsequently, this catalyst was placed in a quartz boat, set in an oven, and air in the oven was well replaced with argon. After that, the temperature was raised to 500° C. in the argon atmosphere, argon was replaced with hydrogen, and the temperature was further raised to 700° C. A gas mixture of hydrogen and ethylene (1,000 ml/min. of hydrogen:200 ml/min. of ethylene) was supplied, and the temperature was held at 700° C. for 1 hr, thereby synthesizing carbon fibers and carbon tubes. After the gas mixture was replaced with argon gas, the temperature was lowered to room temperature to obtain an anode catalyst 1SA.

<Synthesis of Anode Catalyst 1ST>

An anode catalyst 1ST was synthesized following the same procedure as for the anode catalyst 1SA except that 20 g of an $SiO_2$—$TiO_2$ powder were used instead of 20 g of the $SiO_2$—$Al_2O_3$ powder.

<Synthesis of Anode Catalyst 1TW>

An anode catalyst 1TW was obtained following the same procedure as for the anode catalyst 1SA except that 20 g of a $TiO_2$—$WO_3$ powder were used instead of 20 g of the $SiO_2$—$Al_2O_3$ powder.

<Synthesis of Anode Catalyst 1ZW>

An anode catalyst 1ZW was obtained following the same procedure as for the anode catalyst 1SA except that 20 g of a $ZrO_2$—$WO_3$ powder were used instead of 20 g of the $SiO_2$—$Al_2O_3$ powder.

<Synthesis of Anode Catalyst 1TM>

An anode catalyst 1TM was obtained following the same procedure as for the anode catalyst 1SA except that 20 g of a $TiO_2$—$MoO_3$ powder were used instead of 20 g of the $SiO_2$—$Al_2O_3$ powder.

<Synthesis of Anode Catalyst 1SS>

An anode catalyst 1SS was obtained following the same procedure as for the anode catalyst 1SA except that 20 g of an $SiO_2$—$SnO_2$ powder were used instead of 20 g of the $SiO_2$—$Al_2O_3$ powder.

<Synthesis of Anode Catalyst 2SA>

An anode catalyst 2SA was synthesized following the same procedure for the anode catalyst 1SA except that the addition amount of the aqueous chloroplatinic acid solution was changed from 240 ml to 120 ml, and the addition amount of the aqueous ruthenium chloride solution (Ru=43 mg/ml) was changed from 120 ml to 60 ml, thereby changing the catalyst supported amount.

<Synthesis of Anode Catalyst 1S>

Twenty g of an $SiO_2$ powder (specific surface area=180 m²/g) suspended in 1,000 ml of water by using a homogenizer. This suspension was placed in a three-necked flask having a mechanical stirrer, reflux condenser, and dropping funnel, and refluxed under stirring for 1 hr. Twenty minutes after 240 ml of an aqueous chloroplatinic acid solution (Pt content=42 mg/ml), 120 ml of ruthenium chloride (Ru content=42 mg/ml), and 60 ml of a 0.1N HCl solution (Fe content=42 mg/ml) of ferric chloride were added, a solution prepared by dissolving 51.0 g of sodium hydrogen carbonate in 1,000 ml of water was gradually dropped (the dropping time was about 7 hrs). After that, the resultant solution was refluxed for 2 hrs. The resultant material was filtered, and the precipitate was washed with pure water. This precipitate was transferred to a flask, and 1 L of sulfuric acid of about 0.1% was added. After the resultant solution was refluxed for 1 hr, the precipitate was filtered and washed. The filtered precipitate was transferred to a flask, and refluxed over pure water for 1 hr. The resultant material was filtered, the precipitate was well washed with pure water, and the precipitate was dried by a dryer at 100° C. The dried precipitate was placed in a high-purity zirconia boat and reduced in a cylindrical oven at 600° C. for 10 hrs by supplying 3% $H_2/N_2$ gas at a flow rate of 100 ml/min. After that, the temperature was returned to room temperature to obtain a catalyst weighing 30.2 g.

Subsequently, this catalyst was placed in a quartz boat, set in an oven, and air in the oven was well replaced with argon. After that, the argon gas temperature was raised to 500° C., argon was replaced with hydrogen, and the temperature was further raised to 700%. A gas mixture of hydrogen and ethylene (1,000 ml/min. of hydrogen:200 mil/min. of ethylene) was supplied, and the temperature was held at 700° C. for 1 hr, thereby synthesizing carbon fibers and carbon tubes. After the gas mixture was replaced with argon gas, the temperature was lowered to room temperature to obtain an anode catalyst 1S.

<Synthesis of Anode Catalyst 1A>

An anode catalyst 1A was obtained following the same procedure as for the anode catalyst 1S except that $Al_2O_3$ was used as a support instead of $SiO_2$, and cobalt chloride was added instead of ferric chloride.

<Synthesis of Anode Catalyst 1Mn>

An anode catalyst 1Mn was obtained following the same procedure as for the anode catalyst 1S except that $MnO_2$ was used as a support instead of $SiO_2$.

<Synthesis of Anode Catalyst 1Z>

An anode catalyst 1Z was obtained following the same procedure as for the anode catalyst 1S except that $ZrO_2$ was used as a support instead of $SiO_2$.

<Synthesis of Anode Catalyst 1M>

An anode catalyst 1M was obtained following the same procedure as for the anode catalyst 1S except that $MoO_3$ was used as a support instead of $SiO_2$.

<Synthesis of Anode Catalyst 1SV>

An anode catalyst 1SV was obtained following the same procedure as for the anode catalyst 1S except that $SiO_2$—$VO_2$ was used as a support instead of $SiO_2$.

<Synthesis of Anode Catalyst 1SG>

An anode catalyst 1SG was obtained following the same procedure as for the anode catalyst 1S except that $SiO_2$—$GeO_2$ was used as a support instead of $SiO_2$.

The structures of the cathode catalysts 1SA, 1ST, 1TW, 1ZM, 1Co, 1Ni, 1SS, 2SA, 1SMn, 1S, 1T, 1M, 1W, 1Sn, and 1SR and the structures of the anode catalysts 1SA, 1ST, 1TW, 1ZW, 1ZM, 1SS, 2SA, 1S, 1A, 1Mn, 1Z, 1M, 1SV, and 1SG were observed by a microscope. The results are shown in Table 2 (to be presented later). In Table 2, "FIG. 1" means that the catalyst had the structure (support-catalyst-carbon material) of the catalyst A, and "FIG. 2" means that the catalyst had the structure (support-carbon material-catalyst) of the catalyst B.

Cathode electrodes and anode electrodes were formed by using the obtained cathode catalysts and anode catalysts, respectively.

<Formation of Cathode Electrode 1SA>

Two g of the cathode catalyst 1SA, 2 g of pure water, 25 g of zirconia balls 5 mm in diameter, and 50 g of zirconia balls 10 mm in diameter were placed in a 50-ml polyethylene vessel and well stirred. In addition, 4.5 g of a 20% NAFION solution and 10 g of 2-ethoxyethanol were added, and the resultant solution was well stirred and dispersed by a bench ball mill for 6 hrs, thereby forming a slurry composition. Water-repellent carbon paper (270 µm, manufactured by TORAY INDUSTRIES) was coated with the slurry composition by using a control coater (gap=750 µm), and the resultant material was air-dried to form a cathode electrode 1SA. The thickness of the catalyst layer was 100 µm.

<Formation of Cathode Electrode 1ST>

A cathode electrode 1ST was formed following the same procedure as for the cathode electrode 1SA except that the cathode catalyst 1ST was used instead of the cathode catalyst 1SA.

<Formation of Cathode Electrode 1TW>

A cathode electrode 1TW was formed following the same procedure as for the cathode electrode 1SA except that the cathode catalyst 1TW was used instead of the cathode catalyst 1SA.

<Formation of Cathode Electrode 1ZW>

A cathode electrode 1ZW was formed following the same procedure as for the cathode electrode 1SA except that the cathode catalyst 1ZW was used instead of the cathode catalyst 1SA.

<Formation of Cathode Electrode 1ZM>

A cathode electrode 1ZM was formed following the same procedure as for the cathode electrode 1SA except that the cathode catalyst 1ZM was used instead of the cathode catalyst 1SA.

<Formation of Cathode Electrode 1Co>

A cathode electrode 1Co was formed following the same procedure as for the cathode electrode 1SA except that the cathode catalyst 1Co was used instead of the cathode catalyst 1SA.

<Formation of Cathode Electrode 1Ni>

A cathode electrode 1Ni was formed following the same procedure as for the cathode electrode 1SA except that the cathode catalyst 1Ni was used instead of the cathode catalyst 1SA.

<Formation of Cathode Electrode 1SS>

A cathode electrode 1SS was formed following the same procedure as for the cathode electrode 1SA except that the cathode catalyst 1SS was used instead of the cathode catalyst 1SA.

<Formation of Cathode Electrode 2SA>

A cathode electrode 2SA was formed following the same procedure as for the cathode electrode 1SA except that the cathode catalyst 2SA was used instead of the cathode catalyst 1SA, and the thickness of the catalyst layer was changed to 106 µm.

<Formation of Cathode Electrode 1SMn>

A cathode electrode 1SMn was formed following the same procedure as for the cathode electrode 1SA except that the cathode catalyst 1SMn was used instead of the cathode catalyst 1SA. The thickness of the catalyst layer was 96 µm.

<Formation of Cathode Electrode 1S>

A cathode electrode 1S was formed following the same procedure as for the cathode electrode 1SA except that the cathode catalyst 1S was used instead of the cathode catalyst 1SA. The thickness of the catalyst layer was 110 µm.

<Formation of Cathode Electrode 1T>

A cathode electrode 1T was formed following the same procedure as for the cathode electrode 1SA except that the cathode catalyst 1T was used instead of the cathode catalyst 1SA. The thickness of the catalyst layer was 100 µm.

<Formation of Cathode Electrode 1M>

A cathode electrode 1M was formed following the same procedure as for the cathode electrode 1SA except that the cathode catalyst 1M was used instead of the cathode catalyst 1SA. The thickness of the catalyst layer was 96 µm.

<Formation of Cathode Electrode 1W>

A cathode electrode 1W was formed following the same procedure as for the cathode electrode 1SA except that the cathode catalyst 1W was used instead of the cathode catalyst 1SA. The thickness of the catalyst layer was 115 µm.

<Formation of Cathode Electrode 1Sn>

A cathode electrode 1Sn was formed following the same procedure as for the cathode electrode 1SA except that the cathode catalyst 1Sn was used instead of the cathode catalyst 1SA. The thickness of the catalyst layer was 96 µm.

<Formation of Cathode Electrode 1SR>

A cathode electrode 1SR was formed following the same procedure as for the cathode electrode 1SA except that the cathode catalyst 1SR was used instead of the cathode catalyst 1SA. The thickness of the catalyst layer was 105 µm.

<Formation of Cathode Electrode of Comparative Example 2>

A cathode electrode of Comparative Example 2 was formed following the same procedure as for the cathode electrode 1SA except that 2 g of the cathode catalyst of Comparative Example 2 were used, and the thickness of the catalyst layer was changed to 90 µm.

<Formation of Anode Electrode 1SA>

Two g of the anode catalyst 1SA, 2 g of pure water, 25 g of zirconia balls 5 mm in diameter, and 50 g of zirconia balls 10 mm in diameter were placed in a 50-ml polyethylene vessel and well stirred. In addition, 4.5 g of a 20% Nafion solution and 10 g of 2-ethoxyethanol were added, and the resultant solution was well stirred and dispersed by a bench ball mill, thereby forming a slurry composition. Water-repellent carbon paper (350 µm, manufactured by TORAY INDUSTRIES) was coated with the slurry composition by using a control coater (gap=900 µm), and the resultant material was air-dried to form an anode electrode 1SA. The thickness of the catalyst layer was 140 µm.

<Formation of Anode Electrode 1ST>

An anode electrode 1ST was formed following the same procedure as for the anode electrode 1SA except that the anode catalyst 1ST was used instead of the anode catalyst 1SA.

<Formation of Anode Electrode 1TW>

An anode electrode 1TW was formed following the same procedure as for the anode electrode 1SA except that the anode catalyst 1TW was used instead of the anode catalyst 1SA.

<Formation of Anode Electrode 1ZW>

An anode electrode 1ZW was formed following the same procedure as for the anode electrode 1SA except that the anode catalyst 1ZW was used instead of the anode catalyst 1SA.

<Formation of Anode Electrode 1ZM>

An anode electrode 1ZM was formed following the same procedure as for the anode electrode 1SA except that the anode catalyst 1ZM was used instead of the anode catalyst 1SA.

<Formation of Anode Electrode 1SS>

An anode electrode 1SS was formed following the same procedure as for the anode electrode 1SA except that the anode catalyst 1SS was used instead of the anode catalyst 1SA.

<Formation of Anode Electrode 2SA>

An anode electrode 2SA was formed following the same procedure as for the anode electrode 1SA except that the anode catalyst 2SA was used instead of the anode catalyst 1SA, and the thickness of the catalyst layer was changed to 130 µm.

<Formation of Anode Electrode 1S>

An anode electrode 1S was formed following the same procedure as for the anode electrode 1SA except that the anode catalyst 1S was used instead of the anode catalyst 1SA. The thickness of the catalyst layer was 125 µm.

<Formation of Anode Electrode 1A>

An anode electrode 1A was formed following the same procedure as for the anode electrode 1SA except that the anode catalyst 1A was used instead of the anode catalyst 1SA. The thickness of the catalyst layer was 135 µm.

<Formation of Anode Electrode 1Mn>

An anode electrode 1Mn was formed following the same procedure as for the anode electrode 1SA except that the anode catalyst 1Mn was used instead of the anode catalyst 1SA. The thickness of the catalyst layer was 120 µm.

<Formation of Anode Electrode 1Z>

An anode electrode 1Z was formed following the same procedure as for the anode electrode 1SA except that the anode catalyst 1Z was used instead of the anode catalyst 1SA. The thickness of the catalyst layer was 135 µm.

<Formation of Anode Electrode 1M>

An anode electrode 1M was formed following the same procedure as for the anode electrode 1SA except that the anode catalyst 1M was used instead of the anode catalyst 1SA. The thickness of the catalyst layer was 124 µm.

<Formation of Anode Electrode 1SV>

An anode electrode 1SV was formed following the same procedure as for the anode electrode 1SA except that the anode catalyst 1SV was used instead of the anode catalyst 1SA. The thickness of the catalyst layer was 121 µm.

<Formation of Anode Electrode 1SG>

An anode electrode 1SG was formed following the same procedure as for the anode electrode 1SA except that the anode catalyst 1SG was used instead of the anode catalyst 1SA. The thickness of the catalyst layer was 133 µm.

<Formation of Anode Electrode of Comparative Example 2>

An anode electrode of Comparative Example 2 was formed following the same procedure as for the anode electrode 1SA except that the anode catalyst of Comparative Example 2 was used.

Fuel cells were manufactured by methods explained by using the obtained cathode electrodes and anode electrodes.

EXAMPLE 18

Each of the cathode electrode 1SA and anode electrode 1SA was cut into a square piece of 3.2×3.2 cm so that the electrode area was 10 cm$^2$. NAFION 117 was sandwiched as a proton conductive solid polymer film between the cathode electrode 1SA and anode electrode 1SA. The resultant structure was bonded by thermocompression bonding at a pressure of 100 kg/cm$^2$ at 125° C. for 30 min, thereby forming a membrane-electrode assembly (MEA). A 2M methanol aqueous solution as fuel was fed to the anode electrode at a flow rate of 0.6 ml/min., and air was fed to the cathode electrode at 60 ml/min. In this state, the open circuit voltage (OCV) of the fuel cell (single cell) was measured, and the single cell voltage (driving voltage) when the current density was 100 mA/cm$^2$ was also measured. The results are shown in Table 2.

EXAMPLES 19–30, 32, & 34–39

Fuel cells were manufactured and the open circuit voltage and driving voltage of each cell were measured following the same procedures as in Example 18 except that the types of cathode electrodes and anode electrodes were changed as shown in Table 2.

EXAMPLE 31

<Formation of Cathode Electrode Composition Sheet>

Two g of the cathode catalyst 2SA and 2 g of water were mixed in an agate mortar. Two g of graphite, 4 g of diethyleneglycol, and 0.5 g of lithium carbonate were further added and kneaded. After that, 1.5 g of a PTFE dispersion (PTFE solid component=60 wt %) were added and kneaded to obtain a solid product. A sheet is formed by stretching this solid product. The film thickness was about 80 μm. The sheet was dipped in 6N sulfuric acid to form pores and washed with water several times. Then, the sheet was dipped in a NAFION solution and impregnated with NAFION at a reduced pressure. The resultant sheet was dried to obtain a cathode electrode composition sheet.

<Formation of Anode Electrode Composition Sheet>

An anode electrode composition sheet was obtained following the same procedure as for the cathode electrode except that the anode catalyst 2SA was used instead of the cathode catalyst 2SA.

Water-repellent carbon paper, the cathode electrode composition sheet, NAFION 117, the anode electrode composition sheet, and water-repellent carbon paper were stacked in this order, and bonded by thermocompression bonding at a pressure of 100 kg/cm$^2$ at 125° C. for 30 min, thereby forming a membrane-electrode assembly (MEA). A 2M methanol aqueous solution as fuel was fed to the anode electrode at a flow rate of 0.6 ml/min., and air was fed to the cathode electrode at 60 ml/min. In this state, the open circuit voltage (OCV) of the fuel cell (single cell) was measured, and the single cell voltage (driving voltage) when the current density was 100 mA/cm$^2$ was also measured. The results are shown in Table 2.

COMPARATIVE EXAMPLE 2

A fuel cell was manufactured and the open circuit voltage and driving voltage of the cell were measured following the same procedures as in Example 18 except that the cathode electrode and anode electrode of Comparative Example 2 were used.

COMPARATIVE EXAMPLE 3

Five g of the cathode catalyst of Comparative Example 2 were dispersed in a methanol aqueous solution (water:methanol=1:1). Two g of tetraethoxysilane dissolved in methanol were added, and 1 ml of 1N hydrochloric acid was also added. After the resultant solution was heated at 60° C. for 5 hrs, the solid product was filtered out. This solid product was dried at 120° C. for 10 hrs and pulverized to obtain a catalyst powder. A cathode electrode of Comparative Example 3 was obtained following the same procedure as for the cathode electrode 1SA except that this catalyst powder was used.

Five g of the anode catalyst of Comparative Example 2 were dispersed in a methanol aqueous solution (water:methanol=1:1). Two g of tetraethoxysilane dissolved in methanol were added, and 1 ml of 1N hydrochloric acid was also added. After the resultant solution was heated at 60° C. for 5 hrs, the solid product was filtered out. This solid product was dried at 120° C. for 10 hrs and pulverized to obtain a catalyst powder. An anode electrode of Comparative Example 3 was obtained following the same procedure as for the anode electrode 1SA except that this catalyst powder was used.

A fuel cell was manufactured and the open circuit voltage and driving voltage of the cell were measured following the same procedures as for Example 18 except that the obtained cathode electrode and anode electrode were used.

TABLE 2

| | | Cathode electrode | | | Anode electrode | | | Voltage (V) | |
|---|---|---|---|---|---|---|---|---|---|
| | | Oxide support | Catalyst | Form | Oxide support | Catalyst | Form | OCV (V) | at 100 mA/cm$^2$ |
| Example 18 | 1 SA | $SiO_2$—$Al_2O_3$ | Pt—Fe | FIG. 1 | 1 SA $SiO_2$—$Al_2O_3$ | Pt—Ru | FIG. 2 | 0.60 | 0.25 |
| Example 19 | 1 ST | $SiO_2$—$TiO_2$ | Pt—Fe | FIG. 1 | 1 SA $SiO_2$—$Al_2O_3$ | Pt—Ru | FIG. 2 | 0.61 | 0.24 |
| Example 20 | 1 TW | $TiO_2$—$WO_3$ | Pt—Fe | FIG. 1 | 1 SA $SiO_2$—$Al_2O_3$ | Pt—Ru | FIG. 2 | 0.63 | 0.21 |
| Example 21 | 1 ZW | $ZrO_2$—$WO_3$ | Pt—Fe | FIG. 1 | 1 SA $SiO_2$—$Al_2O_3$ | Pt—Ru | FIG. 2 | 0.62 | 0.20 |
| Example 22 | 1 Co | $SiO_2$—$Al_2O_3$ | Pt—Co | FIG. 2 | 1 SA $SiO_2$—$Al_2O_3$ | Pt—Ru | FIG. 2 | 0.65 | 0.25 |
| Example 23 | 1 Ni | $SiO_2$—$Al_2O_3$ | Pt—Ni | FIG. 2 | 1 SA $SiO_2$—$Al_2O_3$ | Pt—Ru | FIG. 2 | 0.61 | 0.24 |
| Example 24 | 1 SS | $SiO_2$—$SnO_2$ | Pt—Fe | FIG. 1 | 1 SA $SiO_2$—$Al_2O_3$ | Pt—Ru | FIG. 2 | 0.62 | 0.21 |
| Example 25 | 2 SA | $SiO_2$—$Al_2O_3$ | Pt—Fe | FIG. 1 | 2 SA $SiO_2$—$Al_2O_3$ | Pt—Ru | FIG. 2 | 0.57 | 0.20 |
| Example 26 | 1 SA | $SiO_2$—$Al_2O_3$ | Pt—Fe | FIG. 1 | 1 ST $SiO_2$—$TiO_2$ | Pt—Ru | FIG. 2 | 0.60 | 0.25 |
| Example 27 | 1 SA | $SiO_2$—$Al_2O_3$ | Pt—Fe | FIG. 1 | 1 TW $TiO_2$—$WO_3$ | Pt—Ru | FIG. 2 | 0.61 | 0.24 |
| Example 28 | 1 SA | $SiO_2$—$Al_2O_3$ | Pt—Fe | FIG. 1 | 1 ZW $ZrO_2$—$WO_3$ | Pt—Ru | FIG. 2 | 0.59 | 0.21 |
| Example 29 | 1 SA | $SiO_2$—$Al_2O_3$ | Pt—Fe | FIG. 1 | 1 ZM $ZrO_2$—$MoO_3$ | Pt—Ru | FIG. 2 | 0.58 | 0.20 |

TABLE 2-continued

| | | Cathode electrode | | | Anode electrode | | | Voltage (V) | |
|---|---|---|---|---|---|---|---|---|---|
| | | Oxide support | Catalyst | Form | Oxide support | Catalyst | Form | OCV (V) | at 100 mA/cm$^2$ |
| Example 30 | 1 SA | SiO$_2$—Al$_2$O$_3$ | Pt—Fe | FIG. 1 | 1 SS SiO$_2$—SnO$_3$ | Pt—Ru | FIG. 2 | 0.60 | 0.25 |
| Example 31 | 2 SA | SiO$_2$—Al$_2$O$_3$ | Pt—Fe | FIG. 1 | 2 SA SiO$_2$—Al$_2$O$_3$ | Pt—Ru | FIG. 2 | 0.59 | 0.22 |
| Example 32 | 1 ZM | ZrO$_2$—MoO$_3$ | Pt—Fe | FIG. 1 | 2 SA SiO$_2$—Al$_2$O$_3$ | Pt—Ru | FIG. 2 | 0.60 | 0.23 |
| Example 33 | 1 SMn | SiO$_2$—MnO$_2$ | Pt | FIG. 1 | 1 S SiO$_2$ | Pt—Ru—Fe | FIG. 1 | 0.59 | 0.21 |
| Example 34 | 1 S | SiO$_2$ | Pt | FIG. 1 | 1 A Al$_2$O$_3$ | Pt—Ru—Co | FIG. 2 | 0.60 | 0.21 |
| Example 35 | 1 T | TiO$_2$ | Pt | FIG. 1 | 1 Mn MnO$_2$ | Pt—Ru—Fe | FIG. 1 | 0.58 | 0.19 |
| Example 36 | 1 M | MoO$_3$ | PtCo | FIG. 2 | 1 Z ZrO$_2$ | Pt—Ru—Fe | FIG. 1 | 0.59 | 0.20 |
| Example 37 | 1 W | WO$_3$ | Pt | FIG. 1 | 1 M MoO$_3$ | Pt—Ru—Fe | FIG. 1 | 0.58 | 0.21 |
| Example 38 | 1 Sn | SnO$_2$ | Pt | FIG. 1 | 1 SV SiO$_2$—VO$_2$ | Pt—Ru—Fe | FIG. 1 | 0.57 | 0.19 |
| Example 39 | 1 SR | SiO$_2$—ReO$_2$ | Pt | FIG. 1 | 1 SG SiO$_2$—GeO$_2$ | Pt—Ru—Fe | FIG. 1 | 0.56 | 0.18 |
| Comparative Example 2 | — | Carbon | Pt—Fe | — | — Carbon | Pt—Ru | — | 0.51 | 0.10 |
| Comparative Example 2 | — | Carbon | Pt—Fe | — | — Carbon | Pt—Ru | — | 0.54 | 0.13 |

As shown in Table 2, the single cell open circuit voltage and driving voltage of each of the fuel cells of Examples 18 to 39 in which an oxide having a specific composition was used as a support, and in which carbon nanofibers or carbon nanotubes were formed on the catalyst supported on the support, or the catalyst was supported on carbon nanofibers or carbon nanotubes formed on the support, were higher than those of the fuel cells of Comparative Examples 2 and 3 using the support made up of common carbon particles.

As has been explained in detail above, the present invention can provide a fuel cell catalyst capable of improving the voltage characteristic of a fuel cell, a membrane-electrode assembly including the fuel cell catalyst, and a fuel cell including the fuel cell catalyst.

Additional advantages and modifications will readily occur to those skilled in the art. Therefore, the invention in its broader aspects is not limited to the specific details and representative embodiments shown and described herein. Accordingly, various modifications may be made without departing from the spirit and scope of the general inventive concept as defined by the appended claims and their equivalents.

What is claimed is:

1. A fuel cell catalyst comprising:
   a carbon support in which a carbon atom is substituted with a first element consisting of N and/or P; and
   catalyst particles supported on the carbon support,
   wherein the catalyst particles include at least one of platinum particles and alloy particles containing Pt and an element A, and the element A contains at least one element selected from the group consisting of platinum group elements, period 4 to 6 transition metal elements, and Sn.

2. A catalyst according to claim 1, wherein a content of said at least one first element in the carbon support is 0.1 wt % to 20 wt %.

3. A catalyst according to claim 1, wherein the element A is at least one element selected from the group consisting of Ru, Ir, Os, W, V, Mo, Sn, and Re.

4. A catalyst according to claim 1, wherein an average particle size of the catalyst particles is 1 nm to 100 nm.

5. A catalyst according to claim 1, wherein the catalyst particles are the alloy particles, the element A is at least one element selected from the group consisting of Ru, Ir, Os, W, V, Mo, Sn, Re, Pd, and Rh, the alloy particle satisfies $$Y_1 > Y_2 \quad (1)$$

where $Y_1$ is the number of Pt atoms when the number of atoms of the element A on a surface of the alloy particle is 1, $Y_1$ is larger than 1, and $Y_2$ is the number of Pt atoms when the number of atoms of the element A in an interior of the alloy particle is 1.

6. A catalyst according to claim 1, wherein the catalyst particles are the alloy particles, the element A is at least one element selected from the group consisting of Ru, Ir, Os, W, V, Mo, Sn, Re, Pd, and Rh, the alloy particle satisfies $$Y_1 > Y_3 \quad (2)$$

where $Y_1$ is the number of Pt atoms when the number of atoms of the element A on a surface of the alloy particle is 1, $Y_1$ is larger than 1, and $Y_3$ is the total number of Pt atoms when the total number of atoms of the element A of the alloy particle is 1.

7. A fuel cell catalyst, comprising:
   a carbon support containing at least one element selected from the group consisting of B, N, and P; and
   alloy particles supported on the carbon support and containing an element A and Pt and,
   wherein the element A is at least one element selected from the group consisting of W, V, Mo, and Sn
   wherein the alloy particle satisfies $$Y_1 Y_3 \quad (2)$$

where $Y_1$ is the number of Pt atoms when the number of atoms of the element A on a surface of the alloy particle is 1, $Y_1$ is larger than 1, and $Y_3$ is the total number of Pt atoms when the total number of atoms of the element A of the alloy particle is 1.

8. A fuel cell catalyst comprising: composite material including
   a support containing at least one of an oxide represented by formula (3) below and a composite oxide represented by formula (4) below;

$$M_xO_y \quad (3)$$

$$M_xO_y\text{-}M'_aO_b \quad (4)$$

wherein elements M and M' can be the same or different, and each of the elements M and M' is at least one element selected from the group consisting of Si, Ti, Al, Zr, Ge, Re, V, Mn, W, Mo, and Sn;
catalyst particles supported on the support and having an average particle size of 1/10 or less of an average particles size of the support; and a carbon material extending from the catalyst particles and formed of at least one of carbon fiber and carbon tube, a length of carbon fiber and the carbon tube is equal to or larger than the average particle size of the catalyst particles.

9. A catalyst according to claim 8, wherein an average diameter of each of the carbon fiber and carbon tube is 1 nm to 5,000 nm.

10. A catalyst according to claim 8, wherein the oxide is at least one oxide selected from the group consisting of $SiO_2$, $Al_2O_3$, $WO_3$, $MoO_3$, $SnO_2$, $TiO_2$, $ZrO_2$, and $SnO_2$, and the composite oxide is at least one composite oxide selected from the group consisting of $SiO_2$—$Al_2O_3$, $SiO_2$—$B_2O_3$, $SiO_2$—$WO_3$, $SiO_2$—$P_2O_5$, $SiO_2$—$MoO_3$, $SiO_2$—$RuO_2$, $SiO_2$—$Ir_2O_3$, $SiO_2$—$PtO_2$, $SiO_2$—$Rh_2O_3$, $SiO_2$—$PdO$, $SiO_2$—$ZrO_2$, $SiO_2$—$TiO_2$, $SiO_2$—$Hf_2O_3$, $SiO_2$—$SnO_2$, $SiO_2$—$Al_2O_3$—$P_2O_5$, $SiO_2$—$TiO_2$—$P_2$—$O_5$, and $SiO_2$—$WO_3$—$P_2O_5$.

11. A catalyst according to claim 8, wherein the catalyst particles include at least one of platinum particles and alloy particles containing Pt and an element A, and the element A is at least one element selected from the group consisting of platinum group elements and period 4 to 6 transition metal elements.

12. A catalyst according to claim 8, wherein the average particle size of the support is 1 μm or less, and the carbon fiber and the carbon tube have an average diameter of 1 nm to 5,000 nm.

13. A catalyst according to claim 8, wherein the fuel cell catalyst is an anode catalyst.

14. A fuel cell comprising:
a cathode electrode,
an anode electrode, and
an electrolyte layer provided between the cathode electrode and anode electrode,
wherein at least one of the cathode electrode and anode electrode comprises:
composite material including:
a support containing at least one of an oxide represented by formula (3) below and a composite oxide represented by formula (4) below;

$$M_xO_y \quad (3)$$

$$M_xO_y\text{-}M'_aO_b \quad (4)$$

wherein elements M and M' can be the same or different, and each of the elements M and M' is at least one element selected from the group consisting of Si, Ti, Al, Zr, Ge, Re, V, Mn, W, Mo, and Sn;
catalyst particles supported on the support and having an average particle size of 1/10 or less of an average particle size of the support; and
a carbon material extending from the catalyst particles and formed of at least one of carbon fiber and carbon tube, a length of the carbon fiber and the carbon tube is equal to or larger than the average particle size of the catalyst particles.

15. A fuel cell catalyst comprising: composite material including a support containing at least one of an oxide represented by formula (3) below and a composite oxide represented by formula (4) below;

$$M_xO_y \quad (3)$$

$$M_xO_y\text{-}M'_aO_b \quad (4)$$

wherein elements M and M' can be the same or different, and each of the elements M and M' is at least one element selected from the group consisting of Si, Ti, Al, Zr, Ge, Re, V, Mn, W, Mo, and Sn;
a carbon material supported on the support and formed of at least one of carbon fiber and carbon tube having a diameter smaller than that of the support; and
catalyst particles formed on the carbon material,
wherein an average particle size of the catalyst particles is 1/10 or less of an average particle size of the support, and a length of the carbon fiber and the carbon tube is equal to or larger than the average particle size of the catalyst particles.

16. A catalyst according to claim 15, wherein the average particle size of the support is 1 μm or less, and the carbon fiber and the carbon tube have an average diameter of 1 nm to 5,000 nm.

17. A catalyst according to claim 15, wherein the fuel cell catalyst is a cathode catalyst.

18. A fuel cell comprising composite material which comprises
a cathode electrode,
an anode electrode, and
an electrolyte layer provided between the cathode electrode and anode electrode,
wherein at least one of the cathode electrode and anode electrode comprises: a support containing at least one of an oxide represented by formula (3) below and a composite oxide represented by formula (4) below;

$$M_xO_y \quad (3)$$

$$M_xO_y\text{-}M'_aO_b \quad (4)$$

wherein elements M and M' can be the same or different, and each of the elements M and M' is at least one element selected from the group consisting of Si, Ti, Al, Zr, Ge, Re, V, Mn, W, Mo, and Sn,
a carbon material supported on the support and formed of carbon fiber and/or carbon tube having a diameter smaller than that of the support; and
catalyst particles formed on the carbon material,
wherein an average particles size of the catalyst particles is 1/10 or less an average particle size of the support, and a length of the carbon fiber and the carbon tube is equal to or larger than the average particle size of the catalyst particles.

19. A catalyst according to claim 7, wherein the alloy particles comprise core particles formed of the element A and a Pt layer formed on surfaces of the core particles.

* * * * *